(12) United States Patent
Teranishi et al.

(10) Patent No.: US 10,372,009 B2
(45) Date of Patent: Aug. 6, 2019

(54) OPTICAL DEVICE

(71) Applicant: SHARP KABUSHIKI KAISHA, Sakai, Osaka (JP)

(72) Inventors: Tomoko Teranishi, Sakai (JP); Hiroyuki Moriwaki, Sakai (JP); Eiji Satoh, Sakai (JP); Tadashi Ohtake, Sakai (JP); Hidefumi Yoshida, Sakai (JP); Satoshi Matsumura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/751,245

(22) PCT Filed: Aug. 9, 2016

(86) PCT No.: PCT/JP2016/073429
§ 371 (c)(1),
(2) Date: Feb. 8, 2018

(87) PCT Pub. No.: WO2017/026480
PCT Pub. Date: Feb. 16, 2017

(65) Prior Publication Data
US 2018/0239211 A1    Aug. 23, 2018

(30) Foreign Application Priority Data
Aug. 11, 2015 (JP) ................. 2015-158892

(51) Int. Cl.
G02F 1/17 (2019.01)
G09G 3/34 (2006.01)
(Continued)

(52) U.S. Cl.
CPC ............. G02F 1/167 (2013.01); G02F 1/17 (2013.01); G02F 1/172 (2013.01); G09G 3/344 (2013.01);
(Continued)

(58) Field of Classification Search
CPC . G02F 1/17; G02F 1/167; G02F 1/172; G02F 1/134363; G02F 1/1343;
(Continued)

(56) References Cited

U.S. PATENT DOCUMENTS 6,469,765 B1 * 10/2002 Matsuyama ...... G02F 1/134363
349/141
7,936,405 B2 * 5/2011 Kitagawa .......... G02F 1/134363
349/33

(Continued)

FOREIGN PATENT DOCUMENTS

WO     2013/129373 A1    9/2013
WO     2013/141248 A1    9/2013
WO     2014/002788 A1    1/2014

Primary Examiner — Loha Ben
(74) Attorney, Agent, or Firm — ScienBiziP, P.C.

(57) ABSTRACT

The optical device (100) includes a first substrate (10), a second substrate (20), and an optical layer (30). The first substrate includes a first electrode (11) and a second electrode (12) configured to be provided with mutually different electrical potentials within a pixel. The optical layer may include a medium (31) and a plurality of shape-anisotropic particles (32) dispersed in the medium. At least one of the first electrode and the second electrode may include a plurality of comb teeth portions (11a, 12a) arranged at predetermined intervals along the first direction (D1). When an electric potential difference is applied between the first electrode and the second electrode, the pixel may be configured to have an electrical field distribution in which a strong electric field region having a stronger field intensity than another region is periodically formed parallel to the surface of the optical layer along a second direction (D2) orthogonal to the first direction.

20 Claims, 33 Drawing Sheets

(51) Int. Cl.
  *G02F 1/167*    (2019.01)
  *G02F 1/1343*   (2006.01)
  *G02F 1/13357*  (2006.01)

(52) U.S. Cl.
  CPC ......... *G09G 3/3446* (2013.01); *G02F 1/1336* (2013.01); *G02F 1/134363* (2013.01); *G02F 2201/124* (2013.01)

(58) Field of Classification Search
  CPC ........ G02F 1/136; G02F 1/137; G02F 1/1336; G02F 1/1337; G02F 1/13306; G02F 1/134309; G02F 1/03; G02F 1/07; G02F 2001/134372; G02F 2001/1351; G02F 2201/12; G02F 2201/122–124; G09G 3/34; G09G 3/3406; G09G 3/344; G09G 3/3446; G09G 3/3651; G09G 2300/0417; G09G 2300/0421; G09G 2300/0426; G09G 2300/0809; G09G 2300/0814; G02B 26/00; G02B 26/02
  USPC ........ 359/296, 228, 245, 253; 345/105, 107, 345/84, 204, 214, 690; 349/33, 37, 84, 349/89, 92, 130, 132, 141, 144; 257/72
  See application file for complete search history.

(56) References Cited

U.S. PATENT DOCUMENTS

| | | | | |
|---|---|---|---|---|
| 8,390,750 | B2* | 3/2013 | Ono | G02F 1/134363 345/690 |
| 8,896,520 | B2* | 11/2014 | Murayama | G09G 3/3446 345/105 |
| 9,372,371 | B2* | 6/2016 | Yoshioka | G02F 1/134309 |
| 9,612,486 | B2* | 4/2017 | Yoshida | G02F 1/134363 |
| 9,653,037 | B2* | 5/2017 | Imaoku | G02F 1/19 |
| 9,658,491 | B2* | 5/2017 | Moriwaki | G02F 1/1337 |
| 10,180,613 | B2* | 1/2019 | Moriwaki | G02F 1/13725 |
| 10,197,856 | B2* | 2/2019 | Ohtake | G02F 1/1337 |
| 2015/0015935 | A1 | 1/2015 | Satoh et al. | |
| 2015/0043053 | A1 | 2/2015 | Satoh et al. | |
| 2015/0192807 | A1 | 7/2015 | Satoh | |

\* cited by examiner

FIG. 13A
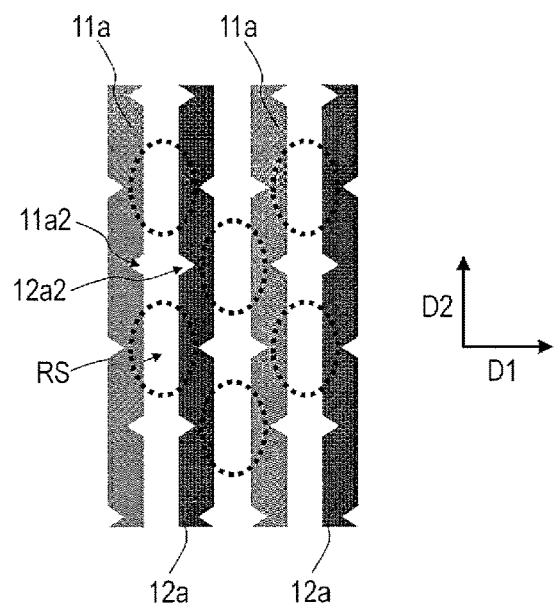
FIG. 13B
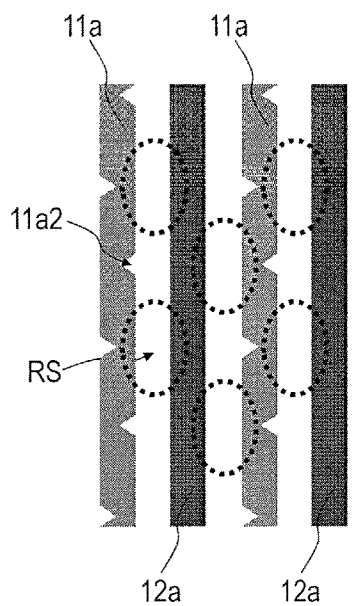
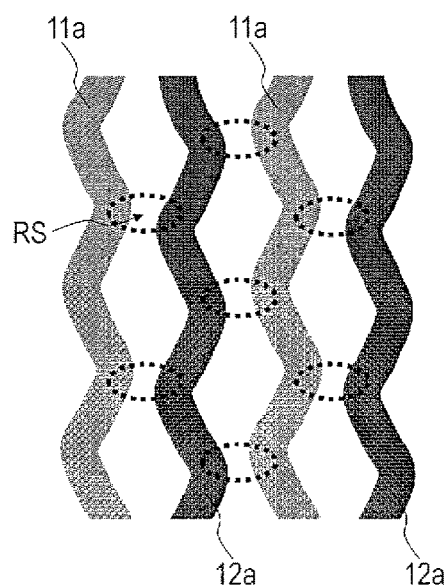
FIG. 14

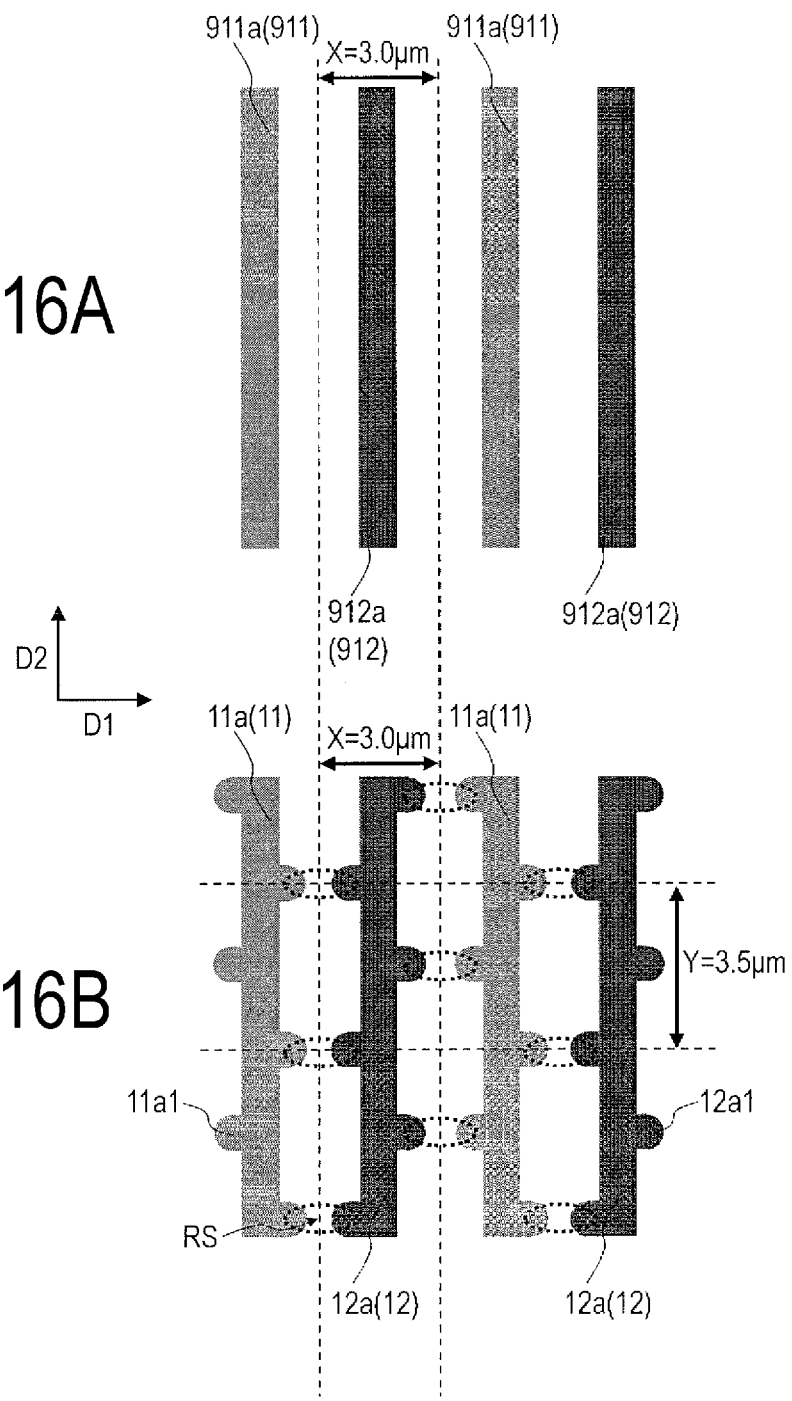

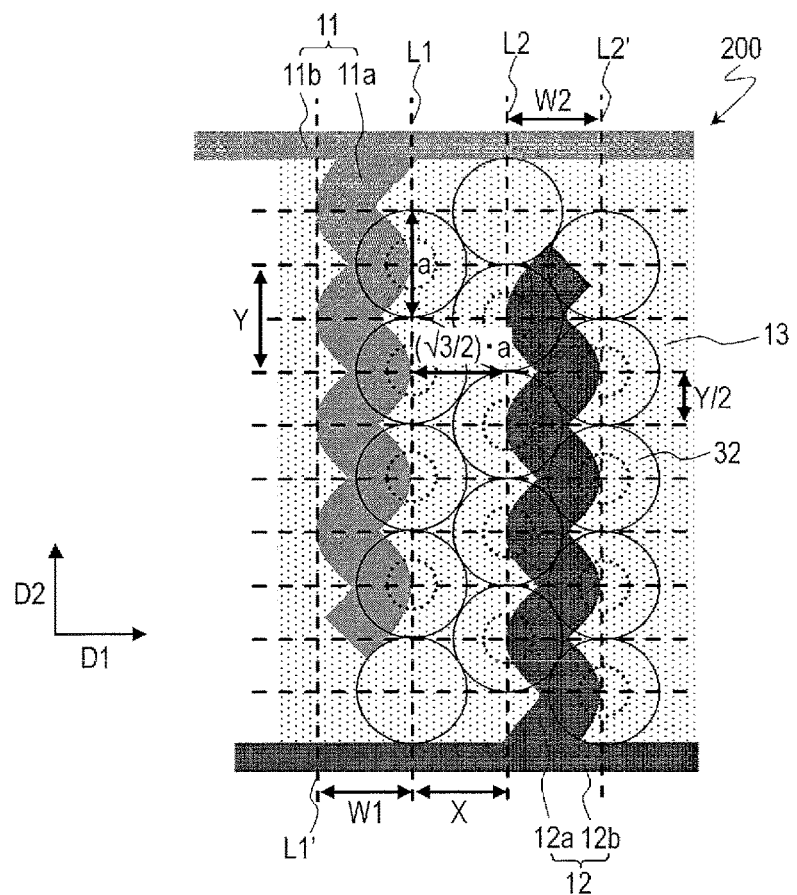
FIG. 21
FIG. 22A
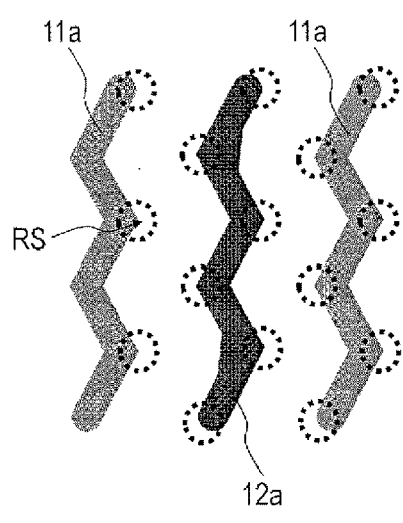
FIG. 22B
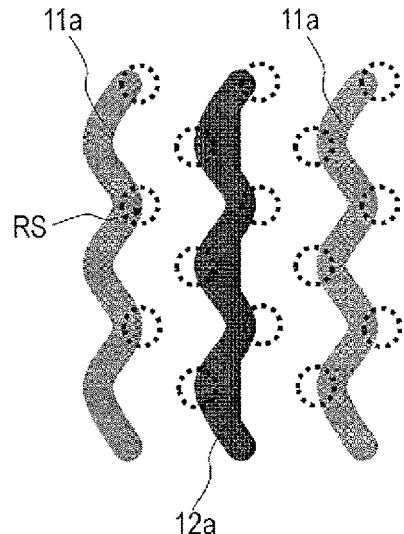

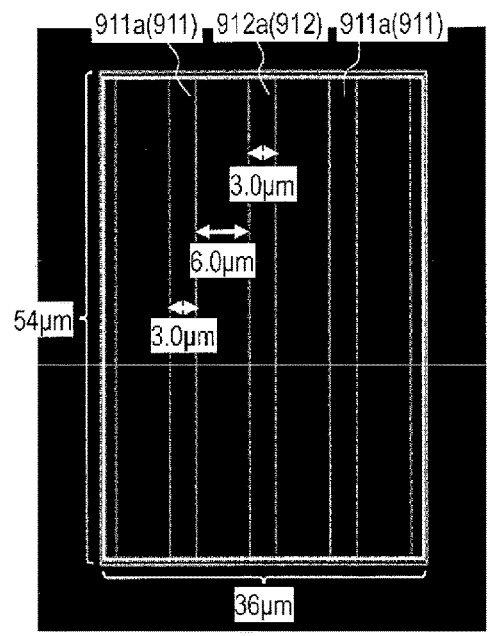
FIG. 26A
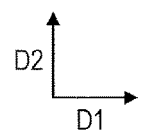
FIG. 26B
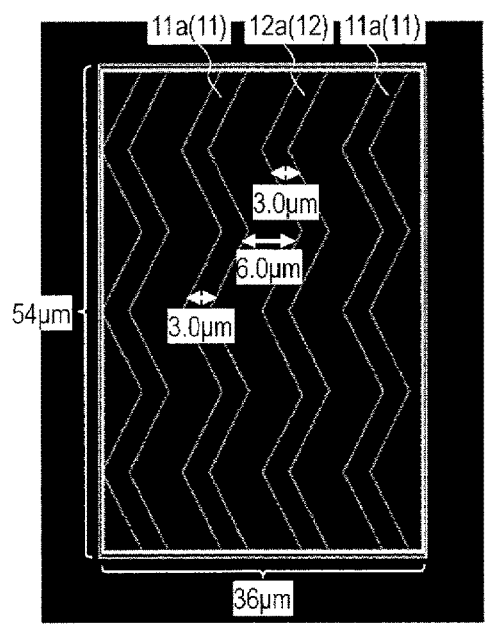

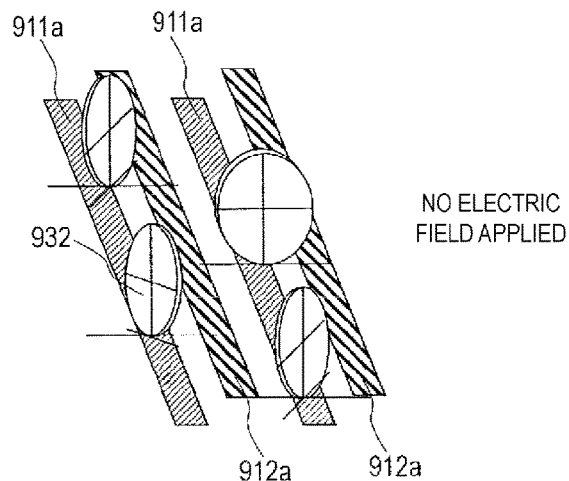
FIG. 37A — NO ELECTRIC FIELD APPLIED
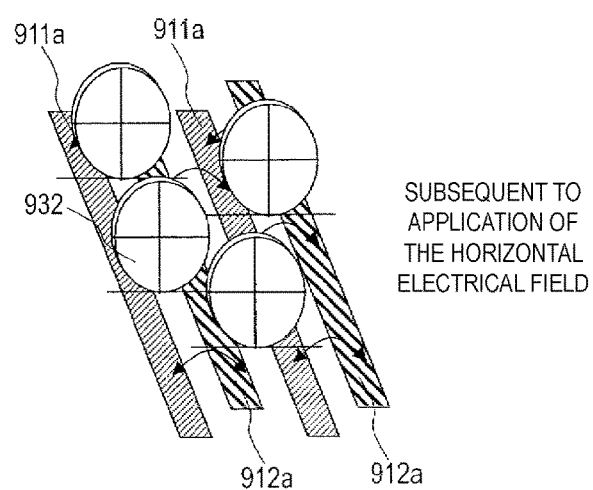
FIG. 37B — SUBSEQUENT TO APPLICATION OF THE HORIZONTAL ELECTRICAL FIELD
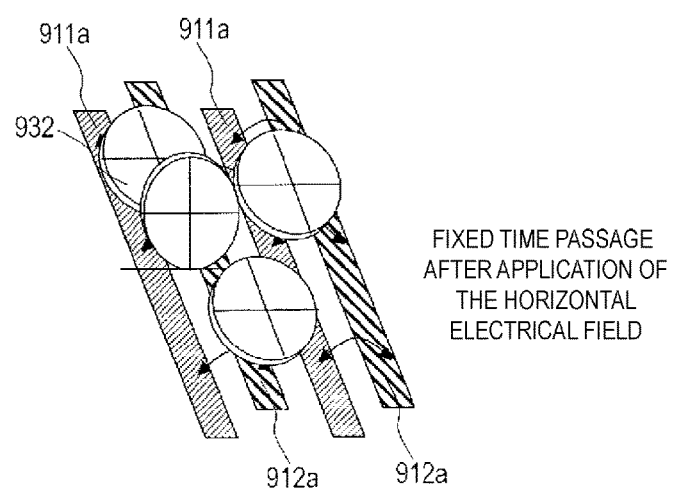
FIG. 37C — FIXED TIME PASSAGE AFTER APPLICATION OF THE HORIZONTAL ELECTRICAL FIELD

NO ELECTRIC FIELD APPLIED

SUBSEQUENT TO APPLICATION OF THE FRINGE ELECTRIC FIELD

FIXED TIME PASSAGE AFTER APPLICATION OF THE FRINGE ELECTRIC FIELD

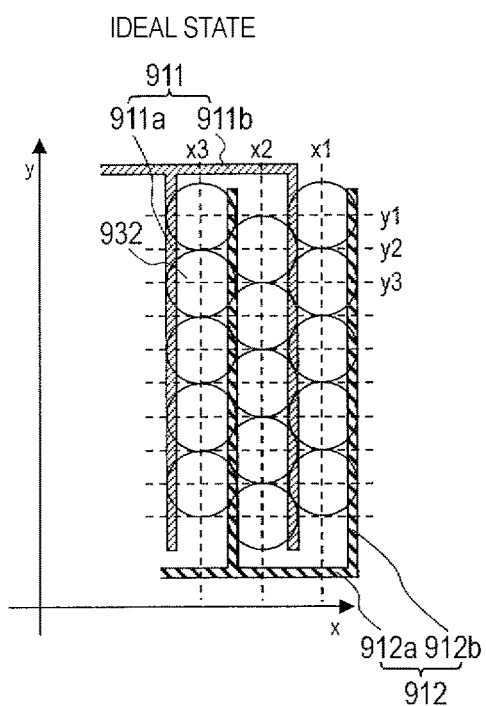
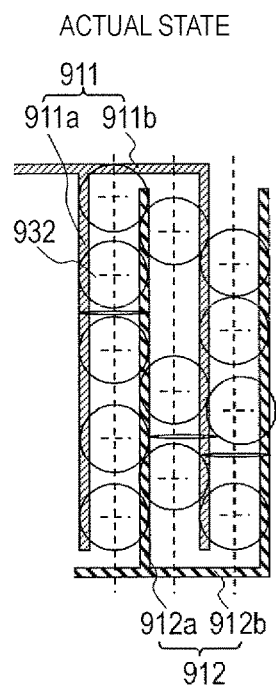
FIG. 39A IDEAL STATE
FIG. 39B ACTUAL STATE
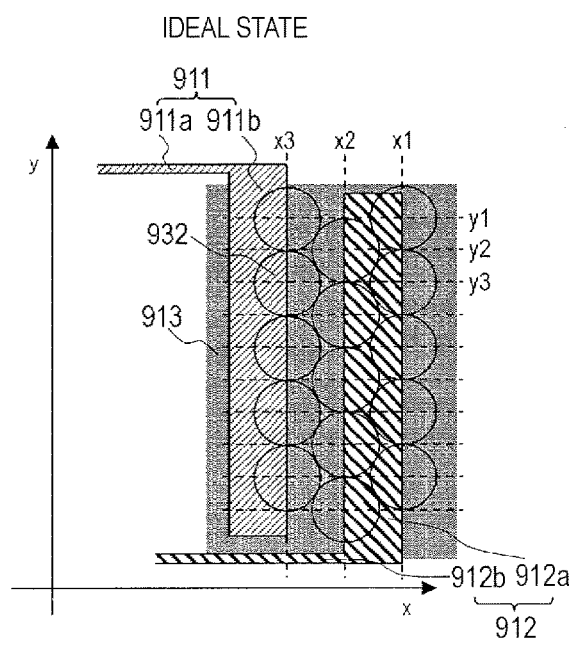
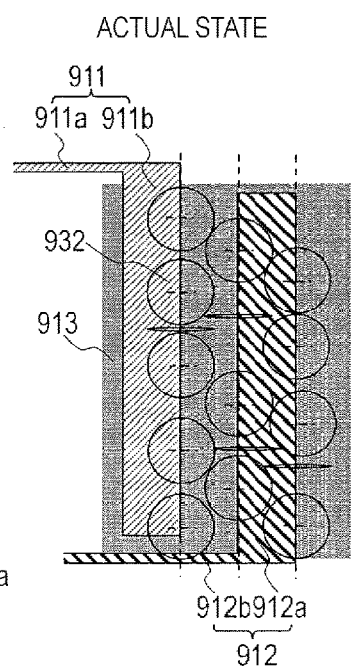
FIG. 40A IDEAL STATE
FIG. 40B ACTUAL STATE

OPTICAL DEVICE

TECHNICAL FIELD

The present invention relates to an optical device, and more particularly relates to an optical device having an optical layer including shape anisotropic particles.

BACKGROUND ART

There is demand for high contrast ratios and high light utilization efficiencies in optical devices that control transmittance (or reflectivity) of incident light.

Liquid crystal panels are well known as optical devices that control light transmittance by applying voltage. Liquid crystal panels generally include a pair of substrates and a liquid crystal layer provided between the substrates. In liquid crystal panels, the alignment of the liquid crystal molecules varies according to the magnitude of the voltage applied to the liquid crystal layer, such that the transmittance of light incident on the liquid crystal panel changes. As liquid crystal panels can achieve substantially high contrast ratios, they are widely used as display devices.

However, as the majority of liquid crystal panels are of a type that utilizes a polarizing plate, more than half of the light used for the display is absorbed by the polarizing plate. As a result, the light utilization efficiency is low. Accordingly, in recent years, the development of optical devices that do not require polarizing plates is progressing.

In PTL 1, a display panel having a light modulation layer including a shape-anisotropic member is proposed. In the display panel of PTL 1, the shape-anisotropic member dispersed in the medium is rotated (that is, the alignment direction is changed) by application of an electrical field to the light modulation layer, such that the light transmittance (or light reflectance) of the light modulation layer is changed.

As the display panel of PTL 1 described above does not require a polarizing plate, its light utilization efficiency can be increased in comparison with liquid crystal panels.

In addition, PTL 2 proposes a light modulation panel capable of changing the direction of an electric field applied to a light modulation layer that includes a shape-anisotropic member. In this light modulation panel, the state in which a vertical electrical field is applied to the light modulation layer and the state in which a horizontal electrical field (or fringe electrical field) are applied to the light modulation layer are switched, such that display may be performed. The vertical electrical field is generated by a pair of solid electrodes opposing each other with the optical layer interposed therebetween, and the horizontal electrical field is generated by a pair of comb-tooth electrodes provided on one of a pair of substrates sandwiching the optical layer. In addition, the fringe electrical field is generated by the comb-tooth electrode and the solid electrode provided on one of the pair of substrates.

CITATION LIST

Patent Literature

PTL 1: WO 2013/129373
PTL 2: WO 2013/141248

SUMMARY OF INVENTION

Technical Problem

However, as a result of a detailed study by the inventors of the present application, in configurations of light modulation panels such as those of PTL 2 where the shape-anisotropic member is oriented by using a horizontal electrical field (or a fringe electrical field) generated by a comb-tooth electrode, it was discovered that a region is generated where no shape-anisotropic member exists in the pixel, resulting in a decrease in reflectance in the reflection mode and a decrease in contrast ratio in the transmission mode. Also, it was discovered that the response speed decreased in both the reflection mode and the transmission mode.

The present invention has been made in view of the above problems, and an object is to reduce the proportion of regions in which no shape-anisotropic particles are present in optical devices having optical layers including shape-anisotropic particles within pixels.

Solution to Problem

An optical device according to an embodiment of the present invention includes a first substrate and a second substrate provided so as to oppose each other, and an optical layer provided between the first substrate and the second substrate, wherein the optical layer includes a pixel, the first substrate includes, in the pixel, a first electrode and a second electrode configured to be provided with mutually different electrical potentials, the optical layer includes a medium and a plurality of shape-anisotropic particles having shape anisotropy diffused in the medium, at least one of the first electrode and the second electrode includes a plurality of comb teeth portions disposed at predetermined intervals along a first direction, and when an electrical potential difference is applied between the first electrode and the second electrode, the pixel is configured to have an electrical field distribution in which a strong electric field region having a stronger field intensity than another region is periodically formed parallel to the surface of the optical layer along a second direction orthogonal to the first direction.

In an embodiment, each of the first electrode and the second electrode has the plurality of comb teeth portions, the first electrode and the second electrode are arranged such that the plurality of comb teeth portions engage with each other, and a horizontal electrical field is generated in the optic layer by the first electrode and the second electrode.

In an embodiment, when a horizontal electrical field is generated in the optical layer, the plurality of shape-anisotropic particles are oriented so as to be substantially parallel to the substrate surface of the first substrate.

In an embodiment, a period Y of the strong electric field region along the second direction and a mode diameter a of the plurality of shape anisotropic particles satisfy a relationship $(0.6) \cdot a \leq Y \leq (1.4) \cdot a$.

In an embodiment, a particular comb tooth portion of the plurality of comb teeth portions of the first electrode is denoted as a first comb tooth portion and two comb teeth portions of the plurality of comb teeth portions of the second electrode that are adjacent to the first comb tooth portion are denoted as a second comb tooth portion and a third comb tooth portion, and the position in the second direction of both the strong electric field region periodically formed between the first comb tooth portion and the second comb tooth portion along the second direction and the strong electric field region periodically formed between the first comb tooth portion and the third comb tooth portion along the second direction is shifted by approximately Y/2.

In an embodiment, a particular comb tooth portion of the plurality of comb teeth portions of the first electrode is denoted as a first comb tooth portion and two comb teeth portions of the plurality of comb teeth portions of the second electrode that are adjacent to the first comb tooth portion are denoted as a second comb tooth portion and a third comb tooth portion, and a distance X along the first direction from a center line between the first comb tooth portion and the second comb tooth portion and a center line between the first comb tooth portion and the third comb tooth portion satisfies a relationship $(0.6) \cdot (\sqrt{3}/2) \cdot a \leq X \leq (1.4) \cdot (\sqrt{3}/2) \cdot a$.

In an embodiment, a particular comb tooth portion of the plurality of comb teeth portions of the first electrode is denoted as a first comb tooth portion and a particular comb tooth portion of the plurality of comb teeth portions of the second electrode that is adjacent to the first comb tooth portion is denoted as a second comb tooth portion, and an interval between the first comb tooth portion and the second comb tooth portion in the strong electric field region is smaller than an interval between the first comb tooth portion and the second comb tooth portion in the another region.

In an embodiment, each of the plurality of comb teeth portions of both the first electrode and the second electrode is not linear.

In an embodiment, each of the plurality of comb teeth portions of both the first electrode and the second electrode is zigzag-shaped.

In an embodiment, each of the plurality of comb teeth portions of one electrode of either the first electrode or the second electrode is approximately linear, and each of the plurality of comb teeth portions of another electrode of either the first electrode or the second electrode is not linear.

In an embodiment, each of the plurality of comb teeth portions of the another electrode is zigzag-shaped.

In an embodiment, each of the plurality of comb teeth portions of both the first electrode and the second electrode is approximately linear, and each of the plurality of comb teeth portions of at least one of the first electrode and the second electrode includes a plurality of protrusions protruding in a direction intersecting with the second direction.

In an embodiment, each of the plurality of comb teeth portions of both the first electrode and the second electrode is approximately linear, and each of the plurality of comb teeth portions of at least one of the first electrode and the second electrode includes a plurality of recessed portions recessed in a direction intersecting with the second direction.

In an embodiment, the first substrate further includes a plurality of dielectric layers overlapping with outer edges of the plurality of comb teeth portions of the first electrode and outer edges of the plurality of comb teeth portions of the second electrode and a plurality of dielectric layers including a dielectric constant different from the dielectric constant of the medium, wherein the plurality of dielectric layers are disposed in the strong electric field region or the another region.

In an embodiment, the dielectric constant of the plurality of dielectric layers is higher than the dielectric constant of the medium, and the plurality of dielectric layers are disposed in the strong electric field region.

In an embodiment, the dielectric constant of the plurality of dielectric layers is lower than the dielectric constant of the medium, and the plurality of dielectric layers are disposed in the another region.

In an embodiment, each of the first electrode and the second electrode have the plurality of comb teeth portions, the first electrode and the second electrode are arranged such that the plurality of comb teeth portions engage with each other, the first substrate further includes a third electrode provided below the first electrode and the second electrode with an insulating layer interposed therebetween, and a fringe electrical field being generated in the optical layer by the first electrode, the second electrode, and the third electrode.

In an embodiment, when a fringe electrical field is generated in the optical layer, the plurality of shape-anisotropic particles are oriented so as to be substantially parallel to the substrate surface of the first substrate.

In an embodiment, a period Y of the strong electric field region along the second direction and a mode diameter a of the plurality of shape-anisotropic particles satisfy a relationship $(0.6) \cdot a \leq Y \leq (1.4) \cdot a$.

In an embodiment, a particular comb tooth portion of the plurality of comb teeth portions of the first electrode is denoted as a first comb tooth portion and a particular comb tooth portion of the plurality of comb teeth portions of the second electrode that is adjacent to the first comb tooth portion is denoted as a second comb tooth portion, and the position in the second direction of both the strong electric field region periodically formed along the second direction on the second comb tooth portion side of the first comb tooth portion and the strong electric field region periodically formed along the second direction on the first comb tooth portion side of the second comb tooth portion is shifted by approximately Y/2.

In an embodiment, a particular comb tooth portion of the plurality of comb teeth portions of the first electrode is denoted as a first comb tooth portion and a particular comb tooth portion of the plurality of comb teeth portions of the second electrode that is adjacent, to the first comb tooth portion is denoted as a second comb tooth portion, and a distance X along the first direction from a virtual straight line that passes through a point located closest to the second comb tooth portion among the outer edges of the first comb tooth portion and is parallel to the second direction and a virtual straight line that passes through a point located closest to the first comb tooth portion among the outer edges of the second comb tooth portion and is parallel to the second direction satisfies a relationship $(0.6) \cdot (\sqrt{3}/2) \cdot a \leq X \leq (1.4) \cdot (\sqrt{3}/2) \cdot a$.

In an embodiment, each of the plurality of comb teeth portions of both the first electrode and the second electrode has a shape configured to concentrate an electric field in the strong electric field region.

In an embodiment, each of the plurality of comb teeth portions of both the first electrode and the second electrode is not linear.

In an embodiment, each of the plurality of comb teeth portions of both the first electrode and the second electrode is zigzag-shaped.

In embodiments, each of the plurality of comb teeth portions of both the first electrode and the second electrode is approximately linear, and each of the plurality of comb teeth portions of both the first electrode and the second electrode includes a plurality of protrusions protruding in a direction intersecting with the second direction.

In an embodiment, the first substrate further includes a plurality of dielectric layers overlapping with outer edges of the plurality of comb teeth portions of the first electrode and outer edges of the plurality of comb teeth portions of the second electrode and a plurality of dielectric layers including a dielectric constant different from the dielectric constant of the medium, wherein the plurality of dielectric layers are disposed in the strong electric field region or the another region.

In an embodiment, the dielectric constant of the plurality of dielectric layers is higher than the dielectric constant of the medium, and the plurality of dielectric layers are disposed in the strong electric field region.

In an embodiment, the dielectric constant of the plurality of dielectric layers is lower than the dielectric constant of the medium, and the plurality of dielectric layers are disposed in the another region.

In an embodiment, the first electrode includes the plurality of comb teeth portions, the second electrode is provided below the first electrode with an insulating layer interposed therebetween, and the first electrode and the second electrode generate a fringe electrical field in the optical layer.

In an embodiment, the second electrode includes a third electrode opposing the first electrode and the second electrode, and a vertical electrical field is generated in the optical layer by the first electrode, the second electrode, and the third electrode.

In an embodiment, when a vertical electrical field is generated in the optical layer, the plurality of shape-anisotropic particles are oriented so as to be substantially perpendicular to the substrate surface of the first substrate.

In an embodiment, the medium is a liquid crystal material, and when no electrical field is applied to the optical layer, the plurality of shape-anisotropic particles are oriented substantially perpendicular to the substrate surface.

In an embodiment, at least one of the first substrate and the second substrate is provided on the optical layer side, and has a vertical alignment film for vertically aligning liquid crystal molecules included in the liquid crystal material.

The display device according to the embodiments of the present invention may include an optical device having the above-described configurations.

In an embodiment, the display device can use externally incident light to perform display in a reflection mode.

In an embodiment, a substrate located on the rear side of the first substrate and the second substrate may include a light absorbing layer that absorbs light.

In an embodiment, the display device further includes a backlight disposed on the rear side of the optical device, and display can be performed in a transmission mode using light irradiated from the backlight to the optical device.

Advantageous Effects of Invention

According to an embodiment of the present invention, in an optical device including an optical layer containing shape-anisotropic particles, it is possible to reduce the proportion of regions in which no shape-anisotropic particles are present within pixels.

BRIEF DESCRIPTION OF DRAWINGS

FIG. 13A and FIG. 13B are diagrams illustrating examples of shapes of the comb tooth portion 11a of the first electrode 11 and the comb tooth portion 12a of the second electrode 12.

FIG. 14 is a diagram illustrating examples of the shapes of the comb tooth portion 11a of the first electrode 11 and the comb tooth portion 12a of the second electrode 12.

FIG. 16A is a diagram illustrating an electrode structure of Comparative Example 1, and FIG. 16B is a diagram illustrating an electrode structure of Example 1.

FIG. 21 is a diagram illustrating a strong electric field region RS formed in a pixel of a display device 200 when a fringe electrical field is applied to the optical layer 30.

FIG. 22A and FIG. 22B are diagrams illustrating examples of shapes of the comb tooth portion 11a of the first electrode 11 and the comb tooth portion 12a of the second electrode 12.

FIG. 26A is a diagram illustrating an electrode structure of Comparative Example 3, and FIG. 26B is a diagram illustrating an electrode structure of Example 3.

FIG. 37A, FIG. 37B, and FIG. 37C are diagrams illustrating changes in the alignment direction of shape-anisotropic particles 932 when a horizontal electrical field is applied to the optical layer.

FIG. 39A and FIG. 39B are diagrams illustrating an ideal state and an actual state, respectively, when shape-anisotropic particles 932 are horizontally oriented by the horizontal electrical field.

FIG. 40A and FIG. 40B are diagrams illustrating an ideal state and an actual state, respectively, when shape-anisotropic particles 932 are horizontally oriented by the fringe electrical field.

DESCRIPTION OF EMBODIMENT

Here, the reason why regions are generated without shape-anisotropic members in pixels will be described.

Figure 36A:
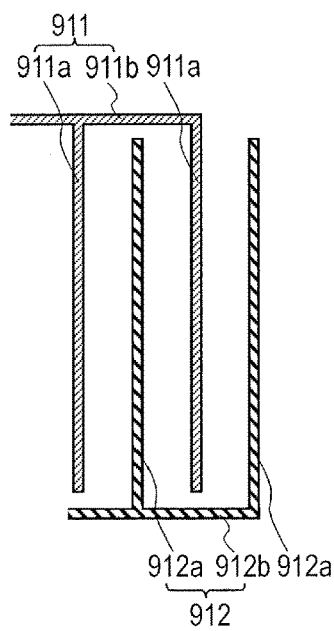
FIG. 36A is a diagram illustrating a electrode configuration in the related art for generating a horizontal electrical field.
Figure 36B:
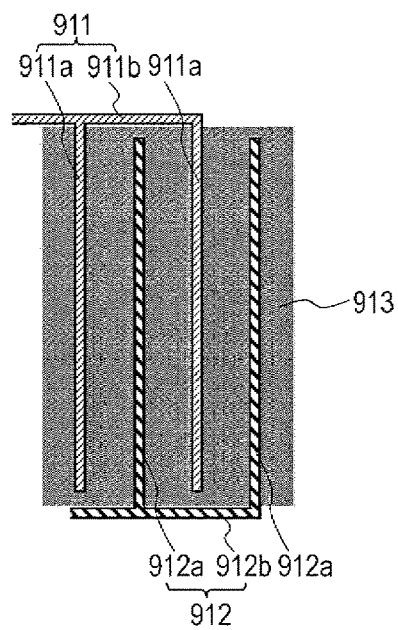
FIG. 36B is a diagram illustrating a electrode configuration in the related art for generating a fringe electrical field.

FIG. 36A illustrates an electrode configuration for generating horizontal electrical fields, and FIG. 36B illustrates an electrode configuration for generating fringe electrical fields.

The configuration depicted in FIG. 36A includes a first electrode 911 and a second electrode 912. The first electrode 911 includes a plurality of comb teeth portions 911a and a connecting portion 911b connecting the plurality of comb teeth portions 911a. Each of the plurality of comb teeth portions 911a is linear. The second electrode 912 includes a plurality of comb teeth portions 912a and a connecting portion 912b connecting the plurality of comb teeth portions 912a. Each of the plurality of comb teeth portions 912a is linear. The first electrode 911 and the second electrode 912 may be arranged so that the plurality of comb teeth portions 911a and 912a engage with each other. When an electrical potential difference is applied between the first electrode 911 and the second electrode 912, a horizontal electrical field is generated.

The configuration depicted in FIG. 36B includes a third electrode 913 in addition to the first electrode 911 and the second electrode 912. The third electrode 913 is provided below the first electrode 911 and the second electrode 912 with an insulating layer (not illustrated) interposed therebetween. The third electrode 913 is a solid electrode. When an electrical potential difference is applied between the first electrode 911, the second electrode 912, and the third electrode 913, a fringe electrical field is generated.

Figure 38A:
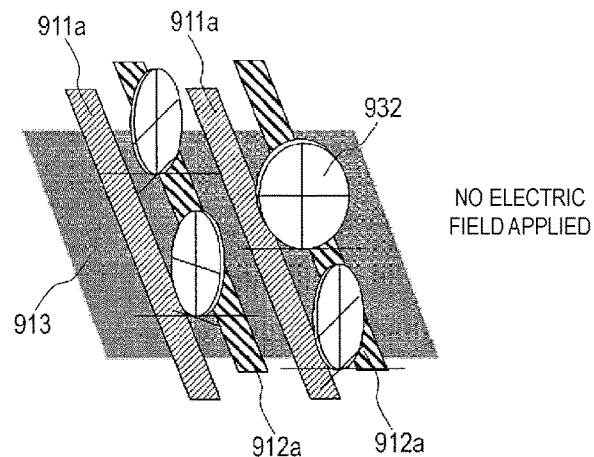
FIG. 38A, FIG. 38B, and FIG. 38C are diagrams illustrating changes in the alignment direction of shape-anisotropic particles 932 when a fringe electrical field is applied to the optical layer.
Figure 38B:
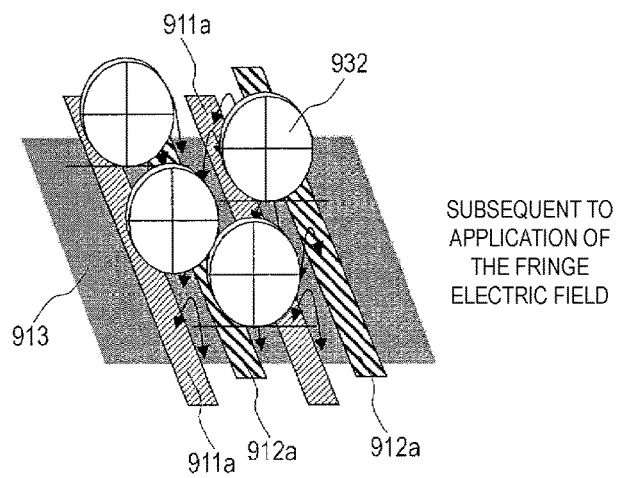
Figure 38C:
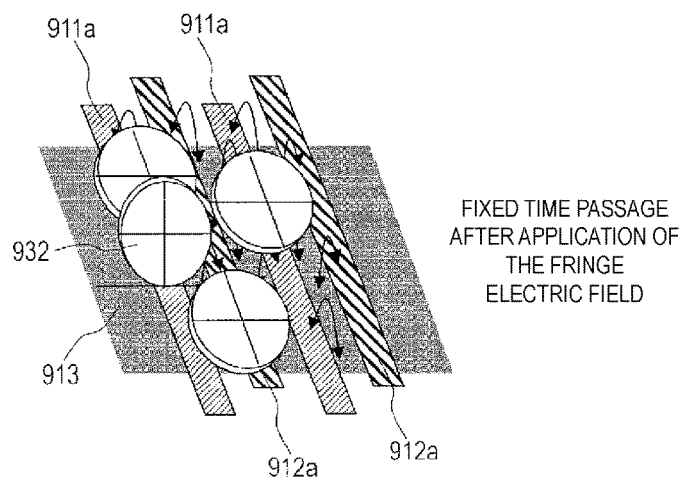

FIG. 37A, FIG. 37B, and FIG. 37C illustrate changes in the alignment direction of the shape-anisotropic particles 932 when a horizontal electrical field is applied to the optical layer. In addition, FIG. 38A, FIG. 38B, and FIG. 38C illustrate changes in the alignment direction of the shape-anisotropic particles 932 when a fringe electrical field is applied to the optical layer. Here, the disk-shaped shape-anisotropic particles 932 are illustrated as an example.

In a state where no electrical field is applied to the optical layer, the shape-anisotropic particles 932 may be oriented perpendicular to the substrate surface as illustrated in FIG. 37A and FIG. 38A. At this time, the disk surface of the shape-anisotropic particles 932 may face a random direction.

Immediately after application of the horizontal electrical field or the fringe electrical field to the optical layer, the shape-anisotropic particles 932 may be rotated so that their disk surfaces are orthogonal to the extending direction of the comb teeth portions 911a and 912a while still being oriented perpendicular to the substrate surface, as illustrated in FIG. 37B and FIG. 38B.

After a fixed time elapses thereafter, the shape-anisotropic particles 932 may be oriented parallel to the substrate surface (that is, they collapse to the substrate surface) as illustrated in FIG. 37C and FIG. 38C. However, as the shape-anisotropic particles 932 are not originally dispersed uniformly on the substrate surface (within the pixel), regions in which the shape-anisotropic particles 932 do not exist (that is, regions not covered by the collapsed shape-anisotropic particles 932) are generated. In addition, some of the shape-anisotropic particles 932 remain standing with respect to the substrate surface as there is no space to collapse.

In the case that the shape-anisotropic particles 932 are oriented horizontally by the horizontal electrical field or the fringe electrical field, it is ideal for the substrate surface to be completely covered by the collapsed shape-anisotropic particles 932 as illustrated in FIG. 39A and FIG. 40A. In reality, however, as illustrated in FIG. 39B and FIG. 40B, regions in which the shape-anisotropic particles 932 are not present are produced, and some shape-anisotropic particles 932 remain standing because there is no space to collapse. This is due to the reasons described below.

When the comb teeth portions 911a and 912a of the first electrode 911 and the second electrode 912 are linear, it is conceivable that the center positions x1, x2, x3, . . . of the shape-anisotropic particles 932 in the alignment direction (the x-axis direction in FIGS. 39A and 40A) of the comb tooth portions 911a and 912a can be regulated by appropriately setting the width and interval of the comb teeth portions 911a and 912a. Even in this case, however, the center positions y1, y2, y3, . . . of the shape-anisotropic particles 932 in the extending direction (the y-axis direction in FIGS. 39A and 40A) of the comb tooth portions 911a and 912a cannot be regulated.

For the reasons described above, it is difficult to completely cover the substrate surface with the collapsed shape-anisotropic particles 932 when applying the horizontal electrical field or the fringe electrical field, and regions where the shape-anisotropic particles 932 are not present are generated. In addition, as some of the shape anisotropic particles 932 do not have space to collapse, they remain standing with respect to the substrate surface, and the response speed decreases due to the time until achievement of the horizontal alignment becoming longer.

Hereinafter, embodiments of the present invention will be described with reference to the drawings. Note that in the following, display devices are given as examples of the optical device according to embodiments of the present invention, but the optical device according to embodiments of the present invention is not limited to display devices.

First Embodiment

Figure 1:
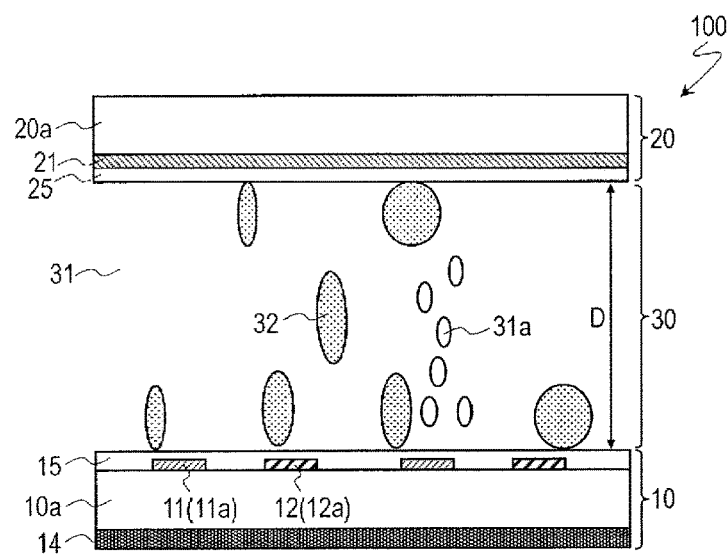
FIG. 1 is a cross-sectional view schematically illustrating a display device 100 according to an embodiment of the present invention, and illustrates a cross section take along the line 1A-1A' of FIG. 2.
Figure 2:
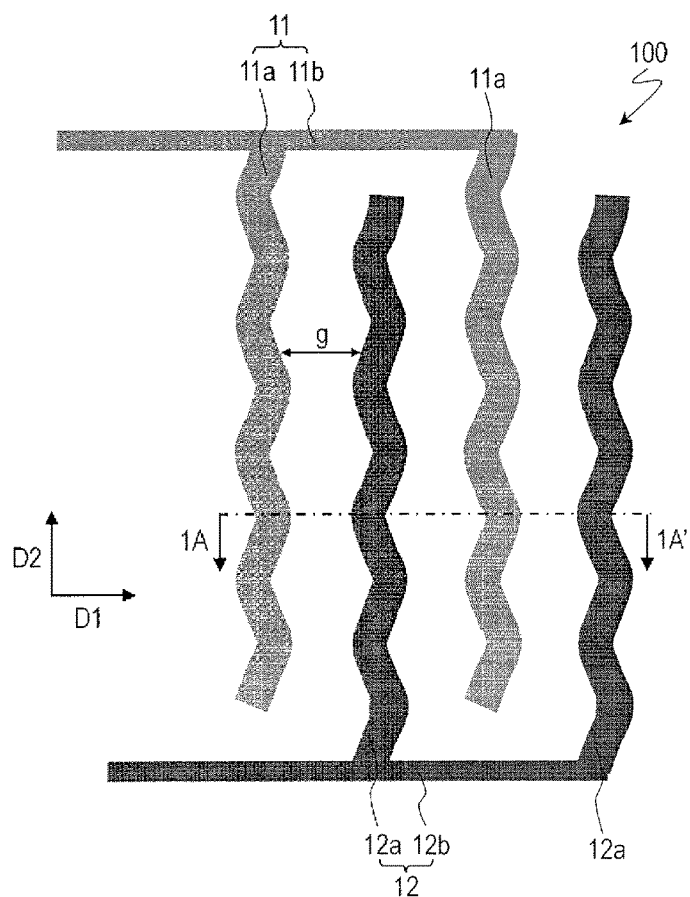
FIG. 2 is a plan view schematically illustrating a display device 100.

FIG. 1 and FIG. 2 illustrate a display device (optical device) 100 according to the present embodiment. FIG. 1 and FIG. 2 are a cross-sectional view and a plan view schematically illustrating the display device 100, respectively. FIG. 1 is a cross-sectional view taken along the line 1A-1A' in FIG. 2.

The display device 100 is a reflective display device capable of performing display in a reflection mode using externally incident light (ambient light). The display device 100 includes a plurality of pixels arranged in a matrix.

As illustrated in FIG. 1, the display device 100 may include a first substrate 10 and a second substrate 20 provided opposite to each other, and an optical layer (display medium layer) 30 provided between the first substrate 10 and the second substrate 20. Hereinafter, the first substrate 10 relatively located on the rear side of the first substrate 10 and the second substrate 20 may be referred to as a "rear side substrate", and the second substrate 20 relatively located on the front side (that is, the viewer side) may be referred to as a "front side substrate" in some cases.

The first substrate (rear side substrate) 10 may include a first electrode 11 and a second electrode 12 that can be provided with different electrical potentials from each other in a pixel. Put differently, the first electrode 11 and the second electrode 12 may be provided in each of the plurality of pixels.

As illustrated in FIG. 2, the first electrode 11 may include a plurality of comb teeth portions (branch portions) 11a arranged at predetermined intervals along the first direction D1, and a connecting portion (trunk portion) 11b connecting the plurality of comb teeth portions 11a. Similarly, the second electrode 122 may include a plurality of comb teeth portions (branch portions) 12a arranged at predetermined intervals along the first direction D1 and a connecting portion (trunk portion) 12b connecting the plurality of comb tooth portions 12a. The first electrode 11 and the second electrode 12 may be arranged such that the plurality of comb teeth portions 11a and 12a engage with each other. Hereinafter, the distance g between a comb tooth portion 11a of the plurality of comb teeth portions 11a of the first electrode 11 and a comb tooth portion 12a of the second electrode 12 adjacent thereto may be referred to as an "interelectrode distance". It should be noted that the number of the comb teeth portions 11a and 12a is not limited to the examples illustrated in FIG. 1 and FIG. 2.

Each of the plurality of comb teeth portions 11a of the first electrode 11 may not be linear, but zigzag-shaped. As a whole, each comb tooth portion 11a may extent substantially in parallel with a second direction D2 orthogonal to the first direction D1. In addition, each of the plurality of comb teeth portions 12a of the second electrode 12 may not be linear, but zigzag-shaped. As a whole, each of the comb tooth portions 12a may extend substantially in parallel with the second direction D2. It should be noted that the first direction D1 and the second direction D2 are parallel to the layer surface of the optical layer 30 (and the substrate surface of the first substrate 10).

The first substrate 10 may be an active matrix substrate, and include thin film transistors (TFTs) and various wirings (such as gate wirings and source wirings electrically connected to TFTs) provided in each pixel (none of which are illustrated herein).

The first substrate 10 may further include a light absorbing layer 14 for absorbing light. The material of the light absorbing layer 14 is not particularly limited. As the material of the light absorbing layer 14, for example, a pigment used as the material of a black matrix such as a liquid crystal display device can be used. Alternatively, a low reflective chromium film having a two-layer structure (having a structure in which a chromium layer and a chromium oxide layer are stacked together) can be used as the light absorbing layer 14.

The constituent elements of the first substrate 10 (the first electrode 11, the second electrode 12, the light absorbing layer 14 and the like described above) may be supported by an insulating substrate (for example, a glass substrate) 10a. Note that, although the light absorbing layer 14 is provided on the rear side of the substrate 10a in FIG. 1, the light absorbing layer 14 may also be provided on the optical layer 30 side of the substrate 10a.

The second substrate (front side substrate) 20 may include a counter electrode 21 opposing the first electrode 11 and the second electrode 12. The counter electrode 21 may be what is referred to as a solid electrode in which no slit or cutout portion is formed. In addition, the counter electrode 21 need not be electrically independent from each pixel, and may be a single continuous conductive film (that is, a shared electrode) common to all of the pixels. When the counter electrode 21 is a solid electrode common to all the pixels, patterning by photolithography techniques may become unnecessary, such that manufacturing costs can be reduced. Also, when color display is performed, the second substrate 20 may further include a color filter (not illustrated). The constituent elements of the second substrate 20 (the above-described counter electrode 21 and the like) may be supported by an insulating substrate (for example, a glass substrate) 20a.

Each of the first electrode 11, the second electrode 12, and the counter electrode 21 may be formed of a transparent conductive material such as indium tin oxide (ITO) or indium zinc oxide (IZO). There are no particular limitations on the method of depositing the conductive film to be used as these electrodes, and various well-known methods such as spattering methods, vacuum deposition methods, plasma CVD methods, and the like can be used. In addition, there are no particular limitations on the method of patterning the conductive film to form the first electrode 11 and the second electrode 12 having the comb tooth portions 11a and 12a, and well-known methods such as photolithography or the like can be used. The thicknesses of the first electrode 11, the second electrode 12, and the counter electrode 21 may, for example, be 100 nm.

The optical layer (display medium layer) 30 may include a liquid medium 31 and a plurality of particles 32 having shape anisotropy (hereinafter referred to as "shape-anisotropic particles") dispersed in the medium 31. The above-described first substrate 10 and second substrate 20 may be bonded via a seal portion (not illustrated herein) formed surrounding the display region, and the medium 31 and the plurality of shape anisotropic particles 32 may be enclosed in a region surrounded by the seal portion (that is, a display region). There is no particular limitation on the thickness (cell gap) D of the optical layer 30.

Here, the shape anisotropic particles 32 may include light reflective characteristics. The shape anisotropic particles 32 may, for example, be flake-shaped (thin-sliced shape).

The alignment direction of the shape-anisotropic particles 32 may change in accordance with the direction of the electrical field applied to the optical layer 30. Put differently, the alignment direction of the shape-anisotropic particles 32 is different in the case that a vertical electrical field is generated in the optical layer by the first electrode 11, the second electrode 12, and the counter electrode 21, and the case that a horizontal electrical field is generated in the optical layer 30 by the first electrode 11 and the second electrode 12. As the shape-anisotropic particles 32 have shape anisotropy, when the alignment direction of the shape-anisotropic particles 32 changes, the projected area of the shape anisotropic particles 32 onto the substrate surface (the substrate surface of the first substrate 10) also changes, and in response, the optical characteristics (here, the reflectance) of the optical layer 30 changes accordingly. In the display device 100 of the present embodiment, this is leveraged to perform display. The reason why the alignment direction of the shape-anisotropic particles 32 changes according to the direction of the applied electrical field will be described in detail later.

Here, the medium 31 is a liquid crystal material that contains liquid crystal molecules 31a. Here, the liquid crystal material may have a positive dielectric anisotropy. That is, the medium 31 may be what is called a positive type liquid crystal material, and the dielectric constant $\varepsilon_{//}$ in the major axis direction of the liquid crystal molecules 31a may be larger than the dielectric constant $\varepsilon\perp$ in the minor axis direction.

Note that the medium 31 may contain materials other than the liquid crystal material. For example, an additive for improving the dispersability of the shape-anisotropic particles 32 may be mixed in the medium 31. Examples of such additives may include a solvent (for example, a mineral spirit) for making the shape-anisotropic particles 32 into a paste, a surfactant, a surface treatment agent for the shape anisotropic particles 32, and the like. Note that, depending on the additive, the liquid crystal material may not be in a liquid crystal state in the medium 31 (that is, it may be in an isotropic state) in some cases.

Each of the first substrate 10 and the second substrate 20 may include vertical alignment films 15 and 25 provided on the optical layer 30 side. The vertical alignment films 15 and 25 vertically align liquid crystal molecules 31a contained in the medium (liquid crystal material) 31 at least in the vicinity of the alignment film interface. Put differently, the vertical alignment films 15 and 25 have an alignment regulating force for aligning the liquid crystal molecules 31a substantially perpendicular to the substrate surface (the substrate surface of the first substrate 10 or the second substrate 20). It should be noted that it is not necessarily required that vertical alignment films be provided on both the first substrate 10 and the second substrate 20, and a vertical alignment film may be provided on only one side (for example, only on the first substrate 10). In addition, the liquid crystal molecules 31 need not be vertically aligned in the entire optical layer 30, and it may be sufficient that they are vertically aligned at least in the vicinity of the interface with the vertical alignment film. Put differently, in regions other than the vicinity of the interface with the vertical alignment film, the liquid crystal molecules 31a are not necessarily vertically aligned, and may be horizontally oriented or oriented at an incline. Of course, as illustrated in the example of FIG. 1, the liquid crystal molecules 31a may be vertically aligned in the entire optical layer 30.

Figure 3:
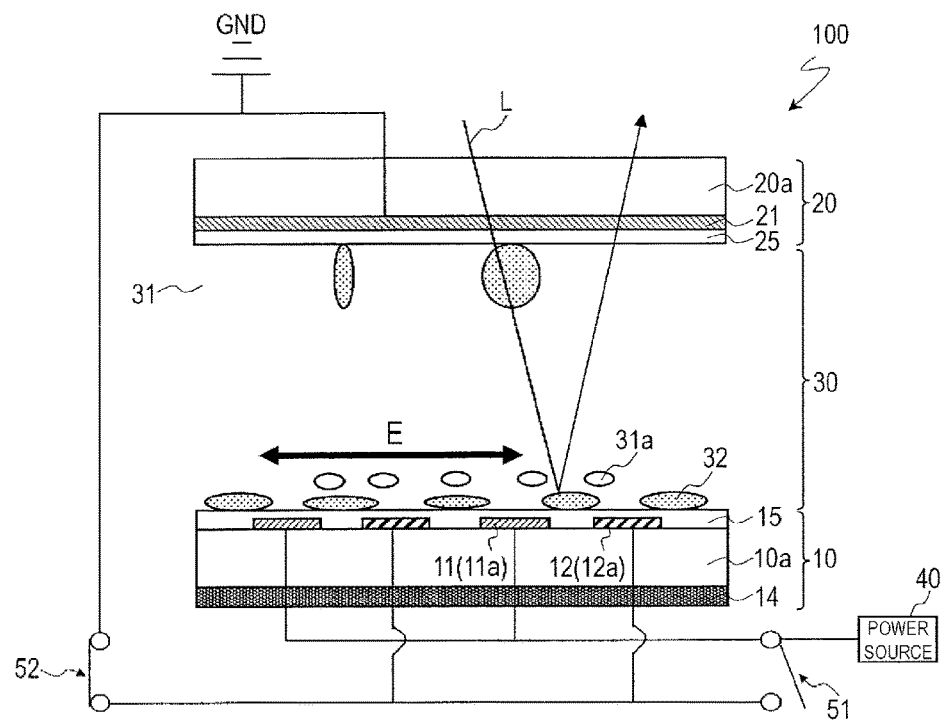
FIG. 3 is a diagram schematically illustrating a display device 100 when a horizontal electrical field is applied to an optical layer 30.
Figure 4:
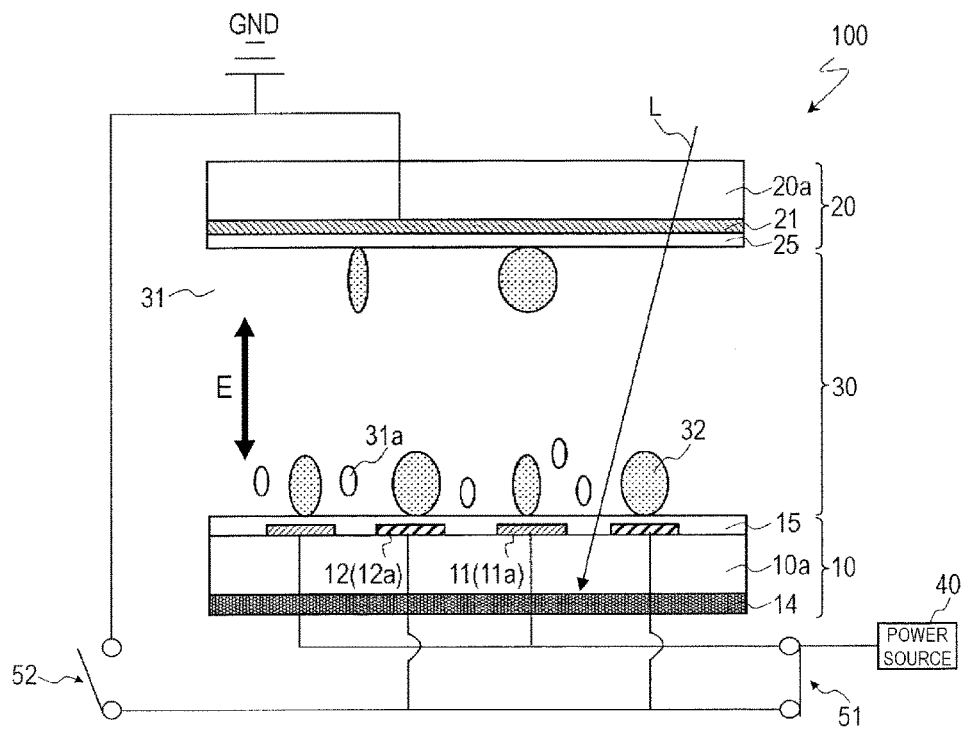
FIG. 4 is diagram schematically illustrating a display device 100 when a vertical electrical field is applied to an optical layer 30.

Hereinafter, the reason why the alignment direction of the shape-anisotropic particles 32 varies according to the direction of the applied electrical field will be described in more detail with reference to FIG. 3 and FIG. 4. FIG. 3 is a diagram schematically illustrating the display device 100 when a horizontal electrical field is applied to the optical layer 30, and FIG. 4 is a diagram schematically illustrating the display device 100 when a vertical electrical field is applied to the optical layer 30. Note that, in FIG. 3 and FIG. 4, the power supply 40 and the switches 51 and 52 are also illustrated to indicate the electrical potential levels of the first electrode 11, the second electrode 12, and the counter electrode 21. One switch 51 controls the On/Off control of the electrical connection between the second electrode 12 and the power supply 40, and the other switch 52 controls the On/Off control of the electrical connection between the second electrode 12 and ground (GND).

In the case that no electric field is applied to the optical layer 30, as illustrated in FIG. 1, the liquid crystal molecules 31a may be oriented so as to be substantially perpendicular to the substrate surface of the first substrate 10 by the alignment regulating forces of the vertical alignment films 15 and 25 (that is, they take on a vertically aligned state). Also, as a result, the shape anisotropic particles 32 also take on a vertically aligned state (that is, the lengthwise direction is oriented so as to be substantially perpendicular to the substrate surface of the first substrate 10).

As illustrated in FIG. 3, when a predetermined voltage is applied between the first electrode 11 and the second electrode 12 (the switch 51 is off and the switch 52 is on), a horizontal electrical field is generated in the optical layer 30. In FIG. 3, the direction of the electrical field is indicated by the arrow E. As can be seen from FIG. 3, the electrical field direction E is substantially parallel to the substrate surface of the first substrate 10 (substantially perpendicular to the thickness direction of the optical layer 30).

At this time, as illustrated in FIG. 3, the liquid crystal molecules 31a may be oriented substantially parallel to the substrate surface of the first substrate 10. In addition, the shape-anisotropic particles 32 (that is, the lengthwise direction thereof) may be oriented so as to be substantially parallel to the substrate surface of the first substrate 10 (that is, they take on a horizontal alignment state). In this state, most of the incident ambient light L is reflected by the shape anisotropic particles 32 in the optical layer 30. Put differently, the optical layer 30 is in a reflecting state in which white display can be performed. Also, by applying a voltage lower than the voltage in the white display state, halftone display can be performed.

Conversely, as illustrated in FIG. 4, when a predetermined voltage is applied between the first electrode 11, the second electrode 12, and the counter electrode 21 (the switch 51 is on and the switch 52 is off), a vertical electrical field is generated in the optical layer 30. In FIG. 4, the direction of the electrical field is indicated by the arrow E. As can be seen from FIG. 4, the electrical field direction E is substantially perpendicular to the substrate surface of the first substrate 10 (substantially parallel to the thickness direction of the optical layer 30).

At this time, as illustrated in FIG. 4, the liquid crystal molecules 31a may be oriented substantially perpendicular to the substrate surface of the first substrate 10. In addition, the shape-anisotropic particles 32 (that is, the lengthwise direction thereof) may be oriented so as to be substantially perpendicular to the substrate surface of the first substrate 10 (that is, they take on a vertical alignment state). In this state, most of the incident ambient light L passes through the optical layer 30. Put differently, the optical layer 30 is in a transparent state. As the ambient light transmitted through the optical layer 30 is absorbed by the light absorbing layer 14, black display can be performed in this state.

Figure 5A:
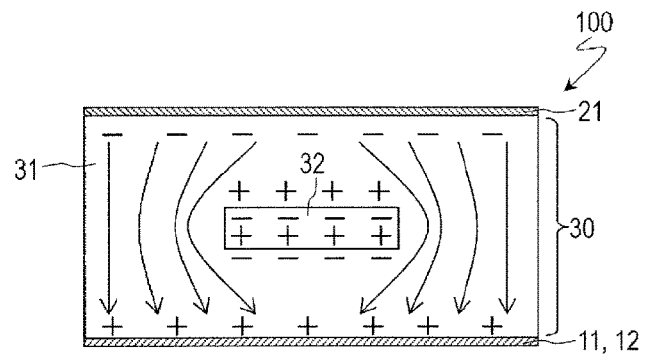
FIG. 5A is a diagram illustrating the state of an optical layer 30 immediately after changing the electrical field applied to the optical layer 30 from a horizontal electrical field to a vertical electrical field.
Figure 5B:
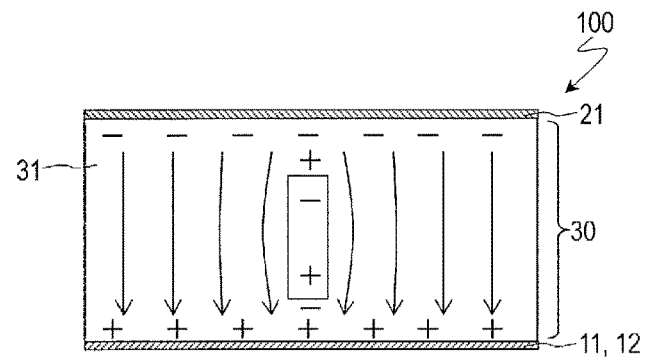
FIG. 5B is a diagram illustrating the state of the optical layer 30 after sufficient time has elapsed thereafter.

The alignment change of the shape-anisotropic particles 32 described above results from the dielectrophoretic force due to the interaction between the electrical field and the electric dipole moment induced thereby. Hereinafter, a more detailed description will be provided with reference to FIG. 5A and FIG. 5B. FIG. 5A and FIG. 5B illustrate the state of the optical layer 30 (distribution of charge and electrical flux lines) immediately after changing the electric field applied to the optical layer 30 from a horizontal electrical field to a vertical electrical field, as well as after a sufficient time has elapsed.

In the case that the dielectric constant of the shape-anisotropic particles 32 is different from the dielectric constant of the medium 31, when the direction of the electrical field applied to the optical layer 30 changes, a large distortion occurs in the electric flux lines as illustrated in FIG. 5A. Accordingly, as illustrated in FIG. 5B, the shape-anisotropic particles 32 rotate so as to minimize the energy.

Generally, the dielectrophoretic force $F_{dep}$ acting on the particles dispersed in the medium is expressed by Expression 1 below, where the dielectric constant of the particles is $\varepsilon_p$, the dielectric constant of the medium is $\varepsilon_m$, the particle radius is a, and the electric field strength is E. Re in Expression 1 is an operator that extracts the real component. Note that, in the present embodiment, the medium 31 may be a liquid crystal material and may have dielectric anisotropy. Put differently, the dielectric constant $\varepsilon_{//}$ in the major axis direction of the liquid crystal molecule 31a may be different from the dielectric constant $\varepsilon\perp$ in the minor axis direction, and it may be conceivable that it corresponds to $\varepsilon_m = \varepsilon_{//} - \varepsilon\perp = \Delta\varepsilon$.

[Expression 1]

$$F_{dep} = 2\pi\varepsilon_m \cdot a^3 \cdot \text{Re} \cdot \left(\frac{\varepsilon_p - \varepsilon_m}{\varepsilon_p + 2\varepsilon_m}\right) \cdot \nabla |E|^2 \qquad (1)$$

Also, as will be understood from the previous description, in addition to the above-mentioned dielectrophoretic force, by causing the shape-anisotropic particles 32 to assume a vertical alignment state with the alignment regulating force of the vertical alignment films 15 and 25 and the support of the liquid crystal molecules 31a, the vertical alignment operation and the horizontal alignment operation of the shape-anisotropic particles 32 can be suitably interchanged.

As described above, in the display device 100 according to embodiments of the present invention, display may be performed by switching between a state in which a vertical electrical field is generated in the optical layer 30 and a state in which a horizontal electrical field is generated in the optical layer 30. As the change from the former state to the latter state and the change from the latter state to the former state are both performed by changing the direction of the applied electrical field, a sufficient response speed can be achieved. In addition, as the display device 100 does not require a polarizing plate, high light utilization efficiency can be achieved.

Further, in the display device 100, a liquid crystal material may be used as the medium 31. Generally, as the resistivity of the liquid crystal material is orders of magnitude higher than the medium exemplified in PTL 2 (propylene carbonate etc.), in the display device 100, occurrence of off leakage through the medium 31 may be prevented in a state in which the TFT is off after writing to the pixel. Accordingly, a high voltage retention ratio can be obtained, and active matrix driving can be suitably performed. In addition, as the leakage current is small, power consumption can be reduced. Assuming that the capacitance of the display panel is C, the voltage applied to the optical layer 30 is V, the drive frequency is f, and the leakage current is I, the power consumption P of the display device 100 is expressed by Expression 2 below.

$$P = C \cdot V \cdot f + I \cdot V \qquad (2)$$

The first term on the right side of Expression 2 is referred to as a pixel capacitance term, and the second term is referred to as a leakage current term. That, is, the power consumption P can be divided into a pixel capacity component and a leakage current component. When the resistivity of the medium 31 is high, the leakage current I decreases, so that it is possible to reduce the power consumption P as is apparent from Expression 2.

Also, in the display device 100, as the vertical alignment films 15 and 25 are provided on the optical layer 30 side of the first substrate 10 and the second substrate 20, the shape-anisotropic particles 32 are prevented from sticking to the alignment film in the horizontal state, such that when a vertical electrical field is generated in the optical layer 30, the majority of the shape-anisotropic particles 32 can be in a vertically aligned state. Accordingly, a high contrast ratio can be achieved. Further, due to the alignment regulating force of the vertical alignment films 15 and 25, the shape-anisotropic particles 32 are prevented from sinking due to their own weight.

Further, in the display device 100 according to the embodiments of the present invention, when a horizontal electrical field is applied to the optical layer 30, the ratio of regions in which shape-anisotropic particles 32 do not exist in the pixel can be reduced. Hereinafter, the reason for this will be described with reference to FIG. 6.

Figure 6:
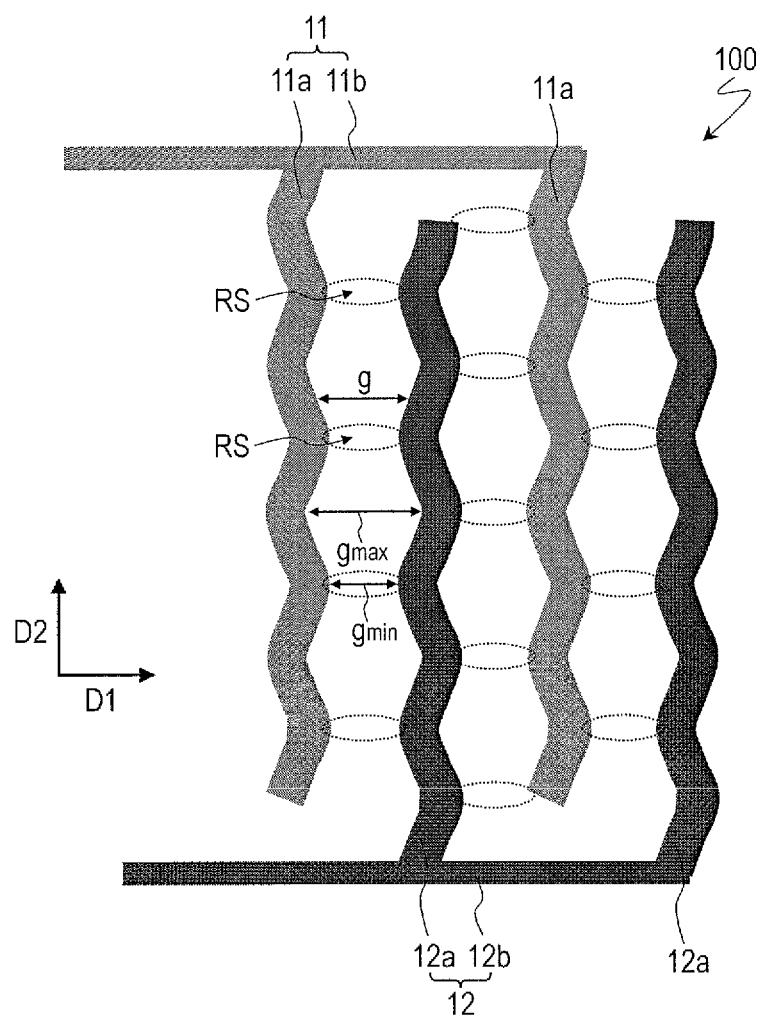
FIG. 6 is a diagram illustrating a strong electric field region RS formed in a pixel of a display device 100 when a horizontal electrical field is applied to the optical layer 30.

When an electrical potential difference is applied between the first electrode 11 and the second electrode 12 (that is, when a horizontal electrical field is applied to the optical layer 30), the pixel of the display device 100 may have an electric field distribution in which a strong electric field region RS having an electric field strength stronger than other regions is periodically formed along the second direction D2, as illustrated in FIG. 6. The reason why the pixel has such an electric field distribution is that the interelectrode distance g in the strong electric field region RS is smaller than the interelectrode distance g in other regions. As can be understood from FIG. 6, in the electrode structure of the display device 100, there are regions within the pixel where the interelectrode distance g takes the minimum value $g_{min}$ and regions where the interelectrode distance g takes the maximum value $g_{max}$. Regions where the interelectrode distance g takes the minimum value $g_{min}$ may periodically exist along the second direction D2. Accordingly, when a horizontal electrical field is applied to the optical layer 30, an electric field distribution as described above is formed.

In this way, in the display device 100, when a horizontal electrical field is applied to the optical layer 30, the strong electric field region RS is periodically formed along the second direction D2. Accordingly, immediately after application of the horizontal electrical field to the optical layer 30 (corresponding to FIG. 37B), the center position of the shape-anisotropic particles 32 in the second direction D2 (the direction in which the comb teeth portions 11a and 12a extend) is defined by the periodicity of the strong electric field region RS. As such, as the shape-anisotropic particles 32 collapse in a more uniformly distributed manner, it is possible to reduce the ratio of regions in which shape-anisotropic particles 32 are not present. Also, it is possible to reduce both shape-anisotropic particles 32 that remain standing with respect to the substrate surface because there is no space to collapse as well as shape-anisotropic particles 32 that lengthen the time until horizontal alignment is achieved. Accordingly, reflectivity and response speed are improved in the display device 100 of the present embodiment.

Next, a preferable configuration of the display device 100 will be described.

Figure 7:
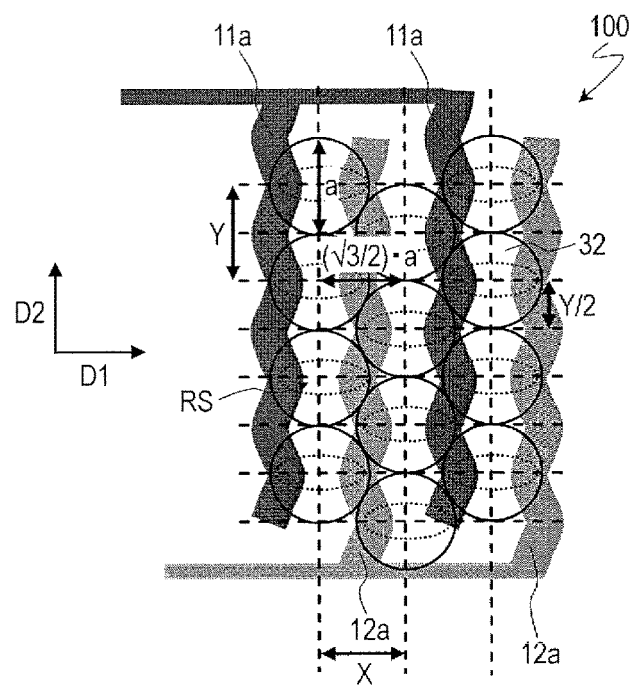
FIG. 7 is a diagram illustrating a strong electric field region RS formed in a pixel of a display device 100 when a horizontal electrical field is applied to the optical layer 30.

In order for the shape-anisotropic particles 32 to collapse on the substrate surface with as little deviation as possible (covering the substrate surface as much as possible with the collapsed shape-anisotropic particles 32), as can be understood from FIG. 7, it is most preferable that the period Y of the strong electric field region RS (that is, the period of the region where the interelectrode distance g takes the minimum value $g_{min}$) along the second direction D2 be substantially the same as the particle diameter of the shape-anisotropic particles 32. In reality, as the plurality of shape-anisotropic particles 32 included in the optical layer 30 have a particle size distribution, it is most preferable that the period of the strong electric field region RS is substantially the same as the mode diameter a of the plurality of shape-anisotropic particles 32. Herein, the "mode diameter" is a particle diameter corresponding to the arithmetic mode of the particle size distribution.

Figure 8:
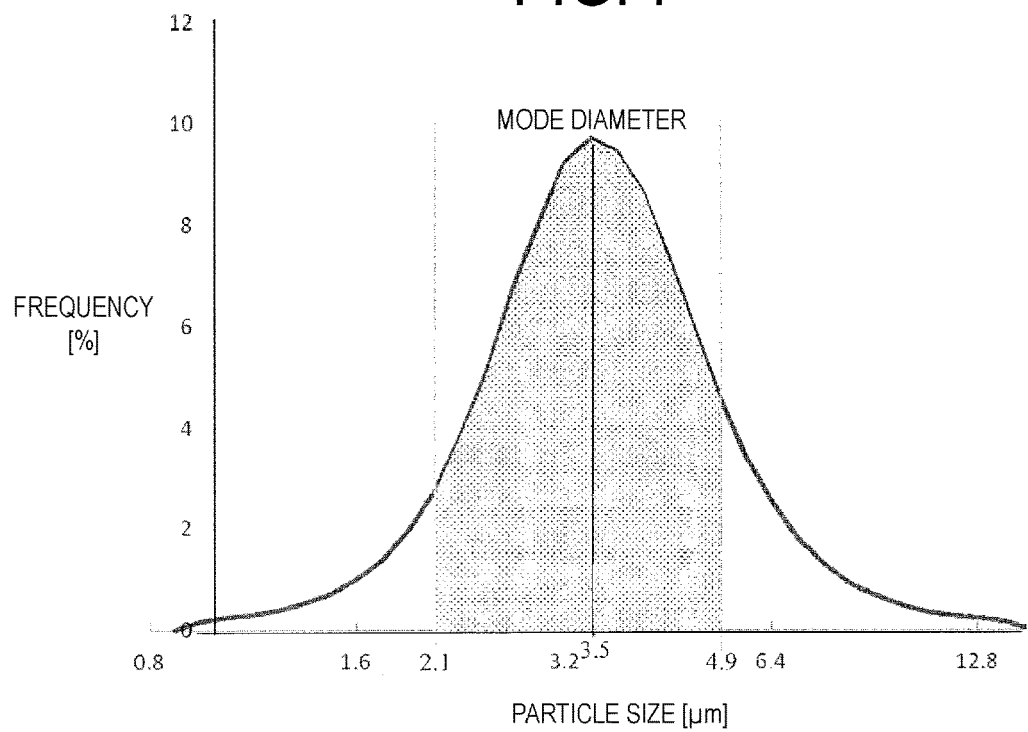
FIG. 8 is a graph illustrating an example of particle size distribution of a plurality of shape-anisotropic particles 32.

However, even in a case where the period Y of the strong electric field region RS is not substantially the same as the mode diameter a of the shape-anisotropic particles 32, in a case where it is close to the mode diameter a by some extent, it is possible to sufficiently reduce the ratio of regions in which shape-anisotropic particles 32 are not present. In particular, when the period Y and the mode diameter a satisfy the relationship given by $(0.6) \cdot a \le Y \le (1.4) \cdot a$, the above effect can be achieved. Here, it is preferable that the period Y be set within a range of the particle size occupying 80% or greater of the whole with the mode diameter a as the center. For example, in a case where the plurality of shape-anisotropic particles 32 have a particle size distribution as indicated in FIG. 8, a frequency of 80% or greater of the whole is occupied in the range of 60% to 140% (that is, a range of 2.1 μm or greater and 4.9 μm or less) of the mode diameter a (specifically, 3.5 μm). Therefore, by satisfying the relationship of $(0.6) \cdot a \le Y \le (1.4) \cdot a$, it is possible to favorably obtain the effect of reducing the ratio of regions in which shape-anisotropic particles 32 are not present.

Herein, for the sake of convenience, a comb tooth portion 11a of the plurality of comb teeth portions 11a of the first electrode 11 will be referred to as a "first comb tooth portion", and two of the comb teeth portions 12a adjacent to the "first comb tooth portion" of the plurality of comb teeth portions 12a of the second electrode 12 will be referred to as a "second comb tooth portion", and a "third comb tooth portion". Also, the region between the "first comb tooth portion" and the "second comb tooth portion", and the region between the "first comb tooth portion" and the "third comb tooth portion" will be referred to as a "slit".

In order for the shape anisotropic particles 32 to collapse on the substrate surface with as little deviation as possible, it is preferable that the position in the second direction D2 of the strong electric field region RS periodically formed along the second direction D2 between the "first comb tooth portion" and the "second comb tooth portion" and the strong electric field region RS periodically formed along the second direction D2 between the "first comb tooth portion" and the "third comb tooth portion" be shifted by approximately Y/2 as illustrated in FIG. 7. That is, it is preferable that the periodic change of the electric field strength on a certain "slit" and the periodic change of the electric field strength on an adjacent "slit" be out of phase by approximately half a period.

In addition, in order for the shape-anisotropic particles 32 to collapse on the substrate surface with as little deviation as possible, it is preferable that the distance X along the first direction D1 (that is, the distance between the center lines of two adjacent "slits") from the center line between the "first comb tooth portion" and the "second comb tooth portion", and the center line between the "first comb tooth portion" and the "third comb tooth portion" be substantially equal to $\sqrt{3}/2$ times the particle diameter (note that the height of an equilateral triangle is $\sqrt{3}/2$ times the length of one side) of the shape-anisotropic particles 32 as illustrated in FIG. 7. In reality, as the plurality of shape-anisotropic particles 32 included in the optical layer 30 have a particle size distribution, it is most preferable that the distance X be substantially equal to $\sqrt{3}/2$ times the mode diameter a (that is, $(\sqrt{3}/2)\cdot a$) of the plurality of shape-anisotropic particles.

However, even in a case where the distance X is not substantially equal to $(\sqrt{3}/2)\cdot a$, in a case where it is close to $(\sqrt{3}/2)\cdot a$ by some extent, it is possible to sufficiently reduce the ratio of regions in which shape-anisotropic particles 32 are not present. In particular, when the distance X and the mode diameter a satisfy the relationship given by $(0.6)\cdot(\sqrt{3}/2)\cdot a \leq X \leq (1.4)\cdot(\sqrt{3}/2)\cdot a$, the above effect can be achieved. Here, it is preferable that the distance X be set based on the range of the particle size occupying 80% or greater of the whole with the mode diameter a as the center. For example, in a case where the plurality of shape anisotropic particles 32 have a particle size distribution as indicated in FIG. 8, a frequency of 80% or greater of the whole is occupied in the range of 60% to 140% of the mode diameter a. Therefore, by satisfying the relationship of $(0.6)\cdot(\sqrt{3}/2)\cdot A \leq X \leq (1.4)\cdot(\sqrt{3}/2)\cdot a$, it is possible to favorably obtain the effect of reducing the ratio of regions in which shape-anisotropic particles 32 are not present.

It should be noted that the shape of the comb tooth portion 11a of the first electrode 11 and the comb tooth portion 12a of the second electrode 12 is not limited to the examples depicted in FIG. 2 or the like. Hereinafter, variations of the comb tooth portion of the first electrode 11 and the comb tooth portion 12a of the second electrode 12 will be described with reference to FIG. 9A to FIG. 12B.

Figure 9A:
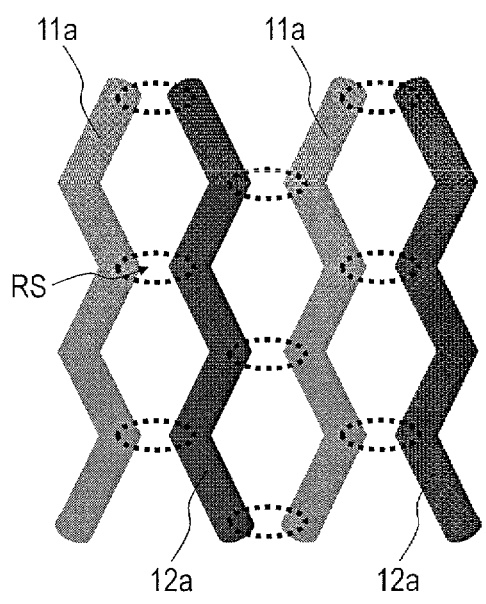
FIG. 9A and FIG. 9B are diagrams illustrating, examples of shapes of the comb tooth portion 11a of the first electrode 11 and the comb tooth portion 12a of the second electrode 12.
Figure 9B:
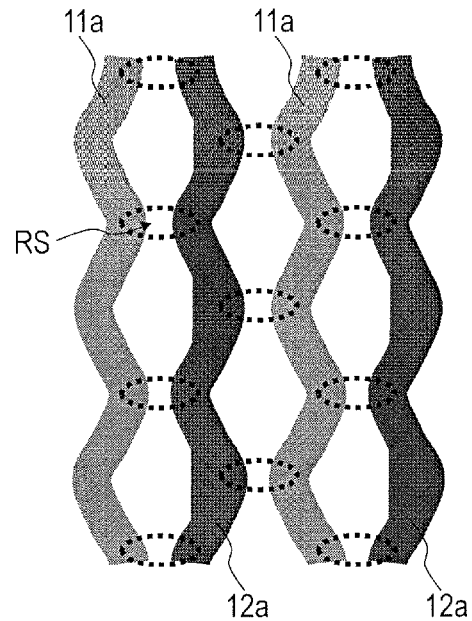

In the examples illustrated in FIG. 9A and FIG. 9B, each comb tooth portions 11a of the first electrode 11 is not linear but zigzag-shaped, and each comb tooth portion 12a of the second electrode 12 is not linear but zigzag-shaped as well. Also, in the example illustrated in FIG. 9A, the edges (outer edges) of the comb tooth portions 11a and 12a of the first electrode 11 and the second electrode 12 have a polygonal shape. In contrast, in the example illustrated in FIG. 9B, the edges of the comb teeth portions 11a and 12a are wavy-line shaped.

In the examples illustrated in FIG. 9A and FIG. 9B, as each comb tooth portion 11a of the first electrode 11 and each comb tooth portion 12 of the second electrode 12 are not linear (more particularly, zigzag-shaped), the interelectrode distance g in the second direction D2 changes, and as a result the strong electric field region RS is periodically formed along the second direction D2.

Figure 10A:
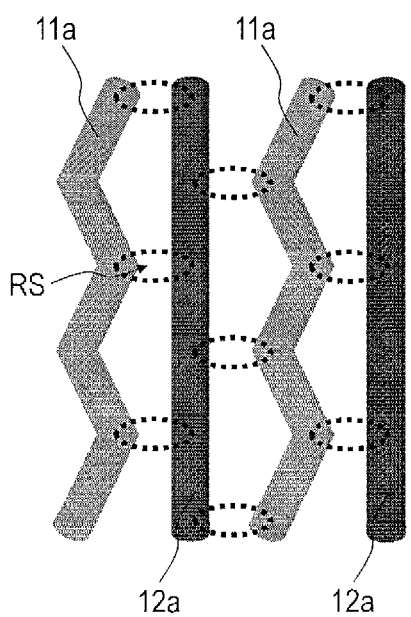
FIG. 10A and FIG. 10B are diagrams illustrating examples of shapes of the comb tooth portion 11a of the first electrode 11 and the comb tooth portion 12a of the second electrode 12.
Figure 10B:
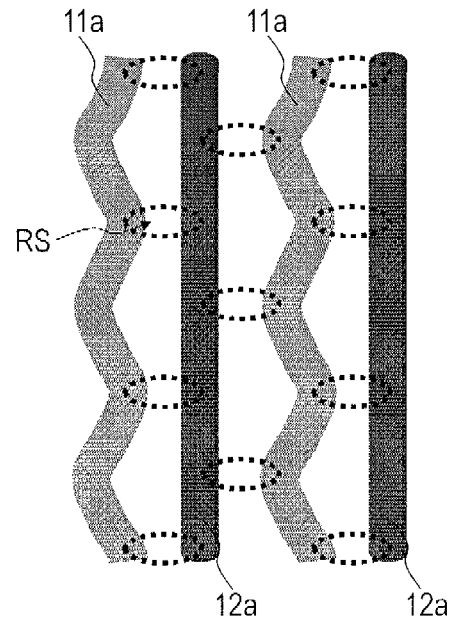

In the examples depicted in FIG. 10A and FIG. 10B, each comb tooth portion 11a of the first electrode 11 is not linear but zigzag-shaped. Conversely, each comb tooth portion 12 of the second electrode 12 is substantially linear. In addition, in the example depicted in FIG. 10A, the edge (outer edge) of the comb tooth portion 11a of the first electrode 11 has a polygonal shape. Conversely, in the example depicted in FIG. 10B, the edge of the comb tooth portion 11a of the first electrode 11 has a wavy-line shape.

In the examples illustrated in FIG. 10A and FIG. 10B, as each comb tooth portion 11a of the first electrode 11 is not linear (more particularly, zigzag-shaped), the interelectrode distance g in the second direction. D2 changes, and as a result the strong electric field region RS is periodically formed along the second direction D2. Note that, in contrast to the examples illustrated in FIGS. 10A and 10B, configurations in which each comb tooth portion 11a of the first electrode 11 is substantially linear and each comb tooth portion 12a of the second electrode 12 is zigzag-shaped are also possible.

Figure 11A:
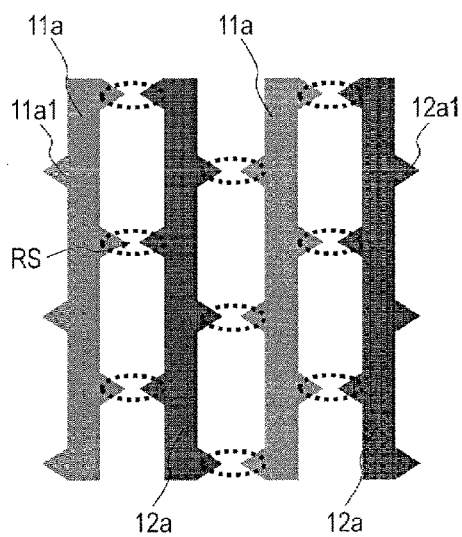
FIG. 11A and FIG. 11B are diagrams illustrating examples of shapes of the comb tooth portion 11a of the first electrode 11 and the comb tooth portion. 12a of the second electrode 12.
Figure 11B:
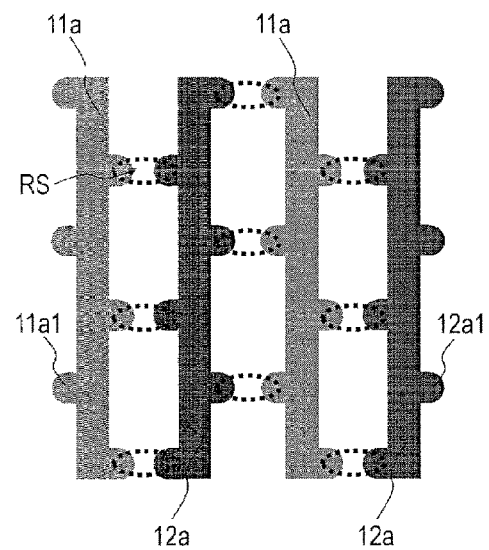

In the examples illustrated in FIG. 11A and FIG. 11B, each comb tooth portion 11a of the first electrode 11 is substantially linear, and each comb tooth portion 12a of the second electrode 12 is substantially linear as well. In addition, each comb tooth portion 11a of the first electrode 11 and each comb tooth portion 12a of the second electrode 12 have a plurality of protruding portions 11a1 and 12a1 protruding in a direction that intersects with the second direction D2 (here, a direction orthogonal to the second direction D2). The shape of each of the plurality of protruding portions 11a1 and 12a1 is not particularly limited herein. Each of the plurality of protruding portions 11a1 and 12a1 may be triangular as in the example depicted in FIG. 11A, or have a semicircular shape as in the example illustrated in FIG. 11B.

In the examples illustrated in FIG. 11A and FIG. 11B, as each comb tooth portion 11a of the first electrode 11 and each comb tooth portion 12a of the second electrode 12 have a plurality of protruding portions 11a1 and 12a1, the interelectrode distance g in the second direction changes, and as a result the strong electric field region RS is periodically formed along the second direction D2.

Figure 12A:
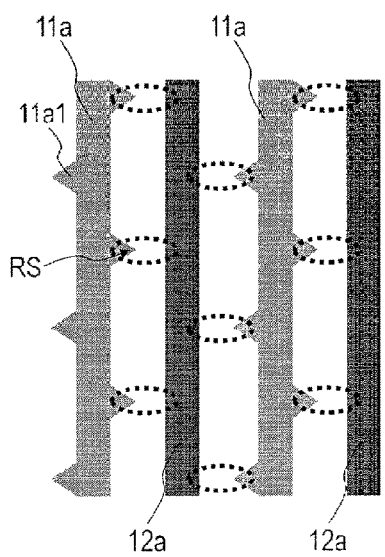
FIG. 12A and FIG. 12B are diagrams illustrating examples of shapes of the comb tooth portion 11a of the first electrode 11 and the comb tooth portion 12a of the second electrode 12.
Figure 12B:
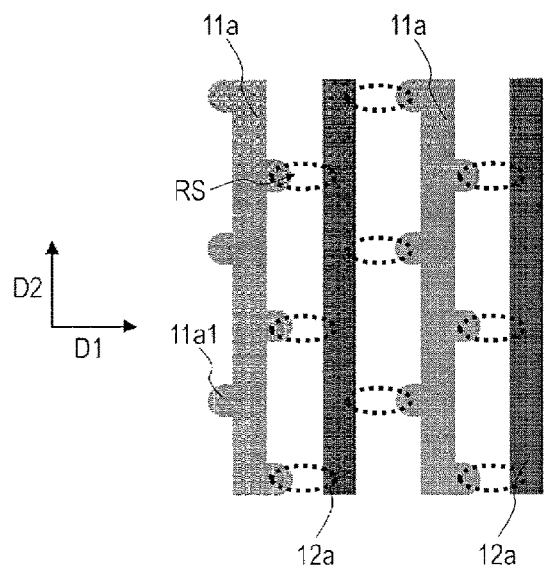
Figure 15A:
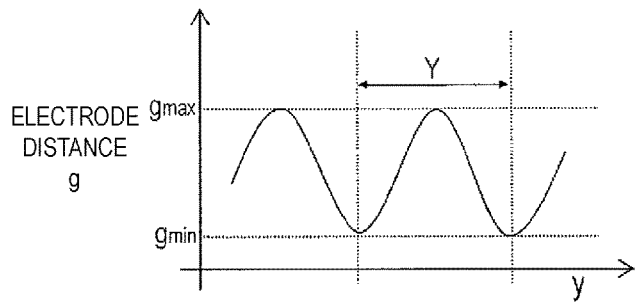
FIG. 15A to FIG. 15E are graphs illustrating examples of the relationship between a position y in the second direction D2 and the interelectrode distance g.
Figure 15B:
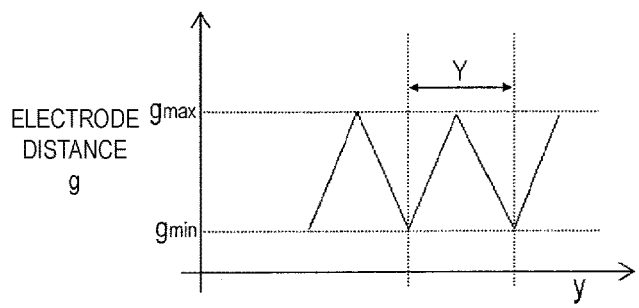
Figure 15C:
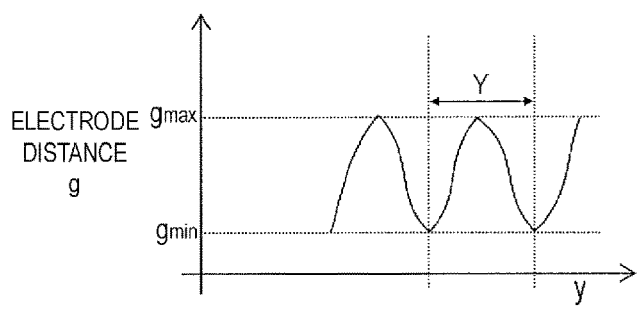
Figure 15D:
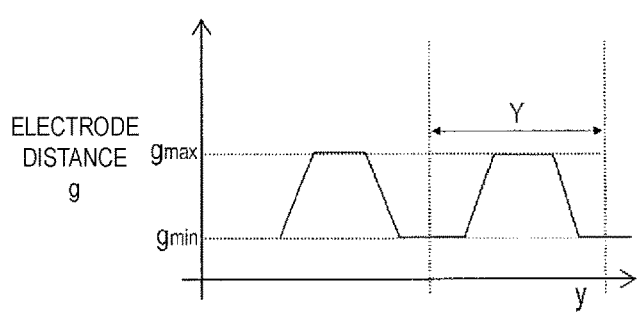
Figure 15E:
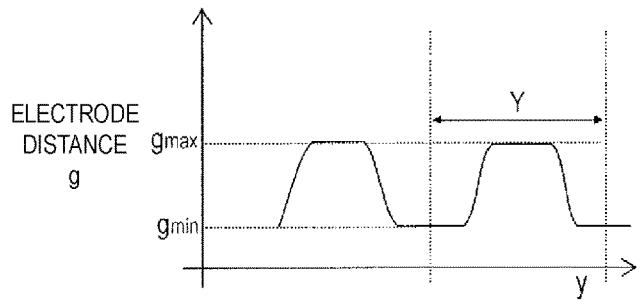

In the examples illustrated in FIG. 12A and FIG. 12B, each comb tooth portion 11a of the first electrode 11 is substantially linear, and each comb tooth portion 12a of the second electrode 12 is substantially linear as well. In addition, each comb tooth portion 11a of the first electrode 11 has a plurality of protruding portions 11a1 protruding in a direction that intersects with the second direction D2 (here, a direction orthogonal to the second direction D2; that is, the first direction D1). In contrast, each of the comb teeth portions 12a of the second electrode 12 does not include a protruding portion. The shape of each of the plurality of protruding portions 11a1 is not particularly limited herein. Each of the plurality of protrusions 11a1 may be triangular as in the example illustrated in FIG. 12A, or have a semi-circular shape as in the example illustrated in FIG. 12B.

In the examples illustrated in FIG. 12A and FIG. 12B, as each comb tooth portion 11a of the first electrode 11 has a plurality of protruding portions 11a1, the interelectrode distance g in the second direction D2 changes, and as a result the strong electric field region RS is periodically formed along the second direction D2. Note that, in contrast to the examples illustrated in FIGS. 12A and 12B, configurations in which each comb tooth portion 11a of the first electrode 11 does not have a protruding portion, and each comb tooth portion 12a of the second electrode 12 has a plurality of protruding portions are also possible.

In the examples illustrated in FIG. 13A, each comb tooth portion 11a of the first electrode 11 is substantially linear, and each comb tooth portion 12a of the second electrode 12 is substantially linear as well. In addition, each comb tooth portion 11a of the first electrode 11 and each comb tooth portion 12a of the second electrode 12 have a plurality of recessed portions 11a2 and 12a2 recessed in a direction that intersects with the second direction D2 (here, a direction orthogonal to the second direction D2). Although FIG. 13A illustrates an example in which each of the plurality of recessed portions 11a2 and 12a2 has a triangular shape, the shape of each of the plurality of recessed portions 11a2 and 12a2 is not limited to a triangular shape.

In the examples illustrated in FIG. 13A, as each comb tooth portion 11a of the first electrode 11 and each comb tooth portion 12a of the second electrode 12 have the plurality of recessed portions 11a2 and 12a2, the interelectrode distance g in the second direction D2 changes, and as a result the strong electric field region RS is periodically formed along the second direction D2.

In the examples illustrated in FIG. 13B, each comb tooth portion 11a of the first electrode 11 is substantially linear, and each comb tooth portion 12a of the second electrode 12 is substantially linear as well. In addition, each comb tooth portion 11a of the first electrode 11 has a plurality of recessed portions 11a2 recessed in a direction that intersects with the second direction D2 (here, a direction orthogonal to the second direction D2). In contrast, each of the comb teeth portions 12a of the second electrode 12 does not include a recessed portion. Although FIG. 13B illustrates an example in which each of the plurality of recessed portions 11a1 has a triangular shape, the shape of each of the plurality of recessed portions 11a1 is not limited to a triangular shape.

In the examples illustrated in FIG. 13B, as each comb tooth portion 11a of the first electrode 11 has a plurality of recessed portions 11a2, the interelectrode distance g in the second direction D2 changes, and as a result the strong electric field region RS is periodically formed along the second direction D2. Note that, in contrast, to the examples illustrated in FIG. 13B, configurations in which each comb tooth portion 11a of the first electrode 11 does not have a recessed portion, and each comb tooth portion 12a of the second electrode 12 has a plurality of recessed portions are also possible.

Also, in the examples illustrated in FIG. 9A and FIG. 9B, the position of the indented portion in the second direction D2 is the same between each of the comb tooth portions 11a of the first electrode 11 and each of the comb tooth portions 12a of the second electrode 12, but as illustrated in FIG. 14, the position of the indented portion in the second direction D2 may be shifted between each comb tooth portion 11a of the first electrode 11 and each comb tooth portion 12a of the second electrode 12.

As described above, as the interelectrode distance g changes in the second direction D2, the strong electric field region RS can be periodically formed along the second direction D2. FIG. 15A to FIG. 15E illustrate examples of the relationship between the position y in the second direction D2 and the interelectrode distance G.

In any of the examples illustrated in FIG. 15A to FIG. 15E, as the interelectrode distance g changes in the second direction D2 (that is, a location is periodically generated where the interelectrode distance g becomes the minimum value $g_{min}$) the strong electric field region RS may be periodically formed along the second electrode D2 regardless of which of the electrode structures of the above examples is utilized. Note that the electrode structure corresponding to the example depicted in FIG. 15A may, for example, be the configuration illustrated in FIG. 9B, and the electrode structure corresponding to the example depicted in FIG. 15E may, for example, be the configuration illustrated in FIG. 14.

Next, a display device 100 according to the present embodiment and a display device having the electrode structure in the related art illustrated in FIGS. 36A and 36B were actually prototyped (referred to as "Example 1" and "Comparative Example 1," respectively), and the results of the measured reflectivity will be described herein.

FIG. 16A illustrates the electrode structure of Comparative Example 1, and FIG. 16B illustrates the electrode structure of Example 1. In each of Comparative Example 1 and Example 1, the mode diameter a of the plurality of shape-anisotropic particles 32 is 3.5 μm.

In the electrode structure of Comparative Example 1, as illustrated in FIG. 16A, each comb tooth portion 911a of the first electrode 911 is linear, and each comb tooth portion 912a of the second electrode 912 is linear as well. In addition, the distance X between the center lines of two adjacent slits is 3.0 μm, which is √3/2 times the mode diameter a of the plurality of shape-anisotropic particles 32.

In the electrode structure of Example 1, as illustrated in FIG. 16B, each comb tooth portion 11a of the first electrode 11 and each comb tooth portion 12a of the second electrode 12 are substantially linear, and further include a plurality of protruding portions 11a1 and 12a1. Also, the distance X between the center lines of two adjacent slits is 3.0 μm, as in Comparative Example 1. The period Y of the strong electric field region RS along the second direction D2 is 3.5 μm, which is the same as the mode diameter a of the plurality of shape-anisotropic particles 32.

Figure 17A:
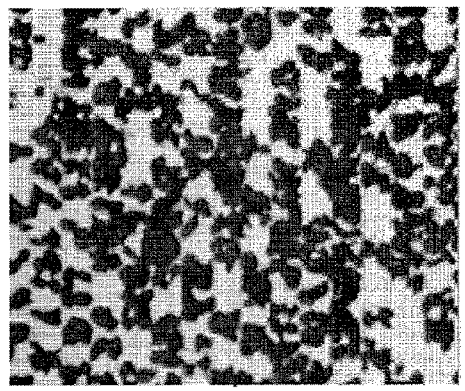
FIG. 17A is an optical microscope image of when a horizontal electrical field is applied to the optical layer of the display device of Comparative Example 1.
Figure 17B:
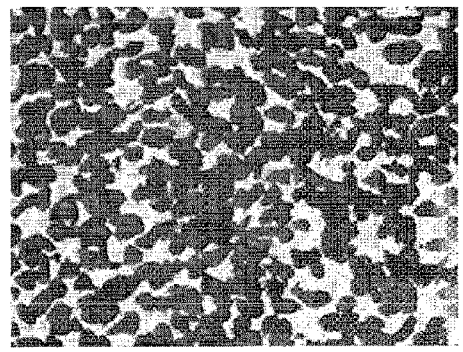
FIG. 17B is an optical microscope image of when a horizontal electrical field is applied to the optical layer 30 of the display device 100 of Example 1.

FIG. 17A illustrates an optical microscope image of when a horizontal electrical field is applied to the optical layer of the display device of Comparative Example 1, and FIG. 17B illustrates an optical microscope image of when a horizontal electrical field is applied to the optical layer 30 of the display device 100 of Example 1. By comparing FIG. 17A and FIG. 17B, it can be understood that in the display device 100 of Example 1, the ratio of regions where collapsed shape-anisotropic particles 32 are not present is lower than that of the display device of Comparative Example 1.

For each of Comparative Example 1 and Example 1, the reflectivity of the SCE method was measured using a d/8 spectrocolorimeter (CM 2002 made by Konica Minolta Co., Ltd), and the reflectivity was 30.5% in Comparative Example 1 and 37.1% in Example 1. That is, higher reflectivity was obtained in Example 1 than Comparative Example 1.

Second Embodiment

Figure 18:
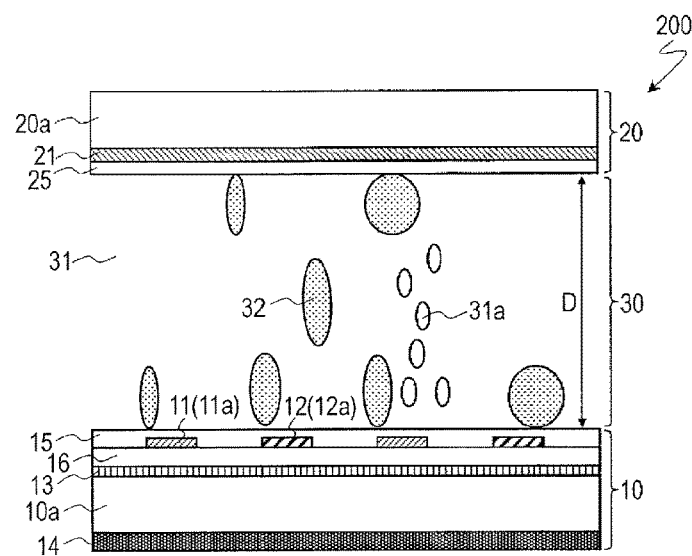
FIG. 18 is a cross-sectional view schematically illustrating a display device 200 according to an embodiment of the present invention.
Figure 19:
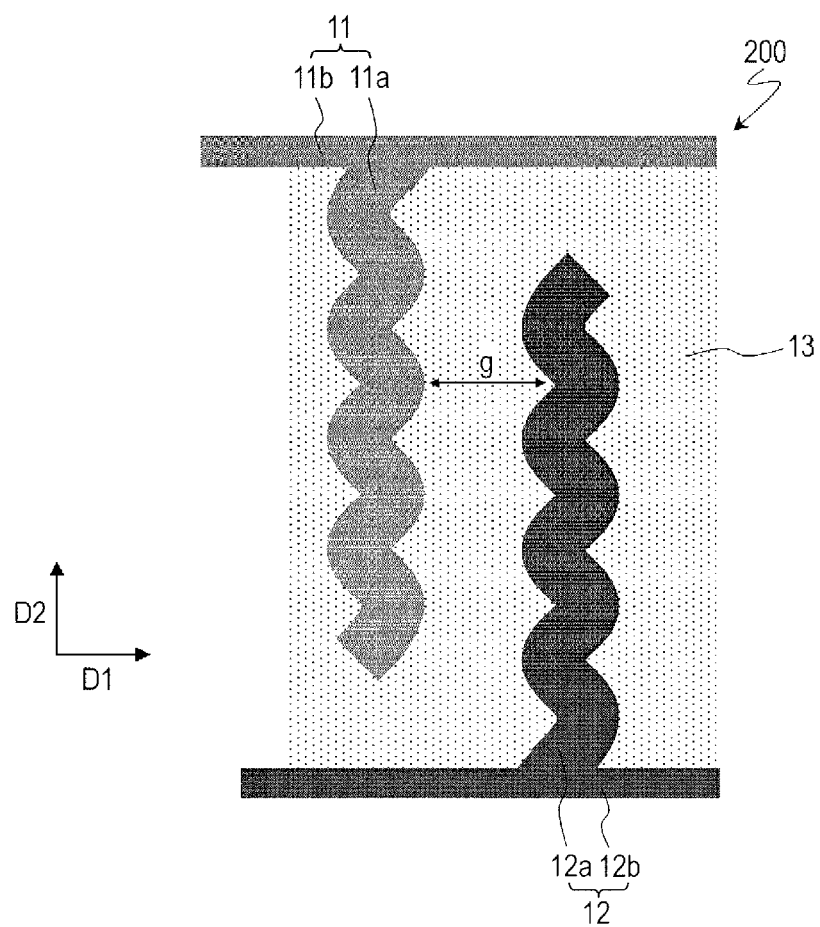
FIG. 19 is a plan view schematically illustrating a display device 200.

FIG. 18 and FIG. 19 illustrate a display device (optical device) 200 of the present embodiment. FIG. 18 and FIG. 19 are a cross-sectional view and a plan view schematically illustrating the display device 200, respectively. Hereinafter, the description will be focused on the differences between the display device 200 according to the present embodiment and the display device 100 of the first embodiment.

The display device 200 according to the present embodiment differs from the display device 100 of Example 1 in that the first substrate 10 further includes a third electrode 13 provided below the first electrode 11 and the second electrode 12 with an insulating layer 16 interposed therebetween.

The third electrode 13 may be what is referred to as a solid electrode in which no slit or cutout portion is formed. The third electrode 13 may be formed of a transparent conductive material such as ITO or IZO. The thickness of the third electrode 13 may, for example, be 100 nm.

As illustrated in FIG. 18 and FIG. 19, the first electrode 11 of the display device 200 may include a plurality of comb teeth portions (branch portions) 11a arranged at predetermined intervals along the first direction D1, and a connecting portion (trunk portion) 11b connecting the plurality of comb teeth portions 11a. Similarly, the second electrode 12 includes a plurality of comb teeth portions (branch portions)

12a arranged at predetermined intervals along the first direction D1, and a connecting portion (trunk portion) 12b connecting the plurality of comb tooth portions 12a. The first electrode 11 and the second electrode 12 may be arranged such that the plurality of comb teeth portions 11a and 12a engage with each other.

Each of the plurality of comb teeth portions 11a of the first electrode 11 is not linear, but zigzag-shaped. Each comb tooth portions 11a, as a whole, extends substantially in parallel with the second direction D2 orthogonal to the first direction D1. Also, each of the plurality of comb teeth portions 12a of the second electrode 12 is not linear, but zigzag-shaped. Each of the comb teeth portions 12a, as a whole, extends substantially in parallel with the second direction D2.

In the display device 200, the plurality of shape-anisotropic particles 32 can be oriented so as to be substantially parallel to the substrate surface of the first substrate 10 by the fringe electric field generated in the optical layer 30 by the first electrode 11, the second electrode 12, and the third electrode 13. In addition, in the display device 200, the first electrode 11 and the second electrode 12 can also generate (in particular, by applying different electrical potentials to the first electrode 11 and the second electrode 12) a horizontal electrical field in addition to the fringe electrical field in the optical layer 30.

In the display device 200 according to the present embodiment, when a fringe electrical field is applied to the optical layer 30, the ratio of the regions in which shape-anisotropic particles 32 are not present in the pixel can be reduced. Hereinafter, the reason for this will be explained with reference to FIG. 20.

Figure 20:
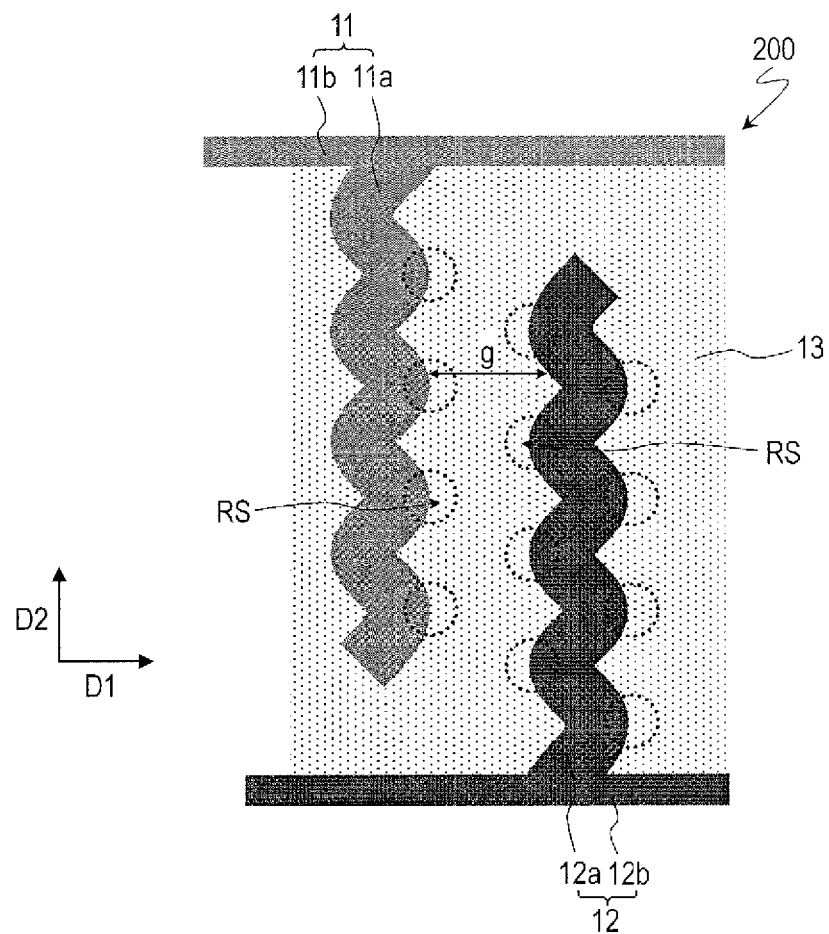
FIG. 20 is a diagram illustrating a strong electric field region RS formed in a pixel of a display device 200 when a fringe electrical field is applied to an optical layer 30.

When an electrical potential difference is applied between the first electrode 11, the second electrode 12, and the third electrode 13 (that is, when a fringe electrical field is applied to the optical layer 30), the pixels of the display device 200 have an electrical field distribution in which a strong electric field region RS having a stronger electric field strength than other regions is periodically formed along the second direction D2, as illustrated in FIG. 20. The reason why the pixels have such an electrical field distribution is because each comb tooth portion 11a of the first electrode 11 and each comb tooth portion 12a of the second electrode 12 have a shape configured to concentrate the electrical field in the strong electric field region RS. The edges (outer edges) of the comb teeth portions 11a and 12a provided as examples herein are wavy-line shaped, and as the density of electric flux lines becomes higher at the peaks than in other regions, the strong electric field region RS is formed. In this way, as portions having shapes configured to concentrate the electrical field periodically exist in the second direction D2, the above-described electrical field distribution may be formed when the fringe electrical field is applied to the optical layer 30. Note that in the examples illustrated in FIG. 19 and FIG. 20, the interelectrode distance g is substantially constant in the second direction D2.

In this way, in the display device 200, when a fringe electrical field is applied to the optical layer 30, the strong electric field region RS may be periodically formed along the second direction D2. As such, immediately after application of the fringe electrical field to the optical layer 30 (corresponding to FIG. 30B), the center position of the shape-anisotropic particles 32 in the second direction D2 (the direction in which the comb tooth portions 11a and 12a extend) may be defined by the periodicity of the strong electric field region RS. Accordingly, as the shape-anisotropic particles 32 collapse in a more uniformly distributed state, it is possible to reduce the ratio of regions where shape-anisotropic particles 32 are not present. Also, it is possible to reduce both shape-anisotropic particles 32 that remain standing with respect to the substrate surface because there is no space to collapse as well as shape-anisotropic particles 32 that lengthen the time until horizontal alignment is achieved. Therefore, reflectivity and response speed may be improved in the display device 200 of this embodiment.

Next, a preferable configuration of the display device 200 will be described.

In order for the shape-anisotropic particles 32 to collapse on the substrate surface with as little deviation as possible (covering the substrate surface as much as possible with the collapsed shape-anisotropic particles 32), as illustrated in FIG. 21, it is most preferable that the period Y of the strong electric field region RS (that is, the period of the portions having a shape configured to concentrate the electrical field) along the second direction D2 be substantially the same as the particle diameter of the shape-anisotropic particles 32. In reality, as the plurality of shape-anisotropic particles 32 included in the optical layer 30 have a particle size distribution, it is most preferable that the period Y of the strong electric field region RS is substantially the same as the mode diameter a of the plurality of shape-anisotropic particles 32.

However, even in a case where the period Y of the strong electric field region RS is not substantially the same as the mode diameter a of the shape-anisotropic particles 32, in a case where it is close to the mode diameter a by some extent, it is possible to sufficiently reduce the ratio of regions in which shape-anisotropic particles 32 are not present. In particular, when the period Y and the mode diameter a satisfy the relationship given by $(0.6) \cdot a \leq Y \leq (1.4) \cdot a$, the above effect can be achieved. Here, it is preferable that the period Y be set within a range of the particle size occupying 80% or greater of the whole with the mode diameter a as the center. For example, in a case where the plurality of shape-anisotropic particles 32 have a particle size distribution as indicated in FIG. 8, a frequency of 80% or greater of the whole is occupied in the range of 60% to 140% of the mode diameter a. Therefore, by satisfying the relationship of $(0.6) \cdot a \leq Y \leq (1.4) \cdot a$, it is possible to favorably obtain the effect of reducing the ratio of regions in which shape-anisotropic particles 32 are not present.

Here, for the sake of convenience, a comb tooth portion 11a of the plurality of comb teeth portions 11a of the first electrode 11 will be referred to as a "first comb tooth portion", and a comb tooth portion 12a adjacent to the "first comb tooth portion" of the plurality of comb teeth portions 12a of the second electrode 12 will be referred to as a "second comb tooth portion".

In order for the shape-anisotropic particles 32 to collapse on the substrate surface with as little deviation as possible, it is preferable that the position in the second direction D2 of the strong electric field region RS periodically formed along the second direction D2 on the "second comb tooth portion" side of the "first comb tooth portion", and the strong electric field region RS periodically formed along the second direction D2 on the "first comb tooth portion" side of the "second comb tooth portion" be shifted by approximately Y/2 as illustrated in FIG. 21.

In addition, in order for the shape-anisotropic particles 32 to collapse on the substrate surface with as little deviation as possible, it is preferable that the distance X along the first direction from a virtual straight line L1 that passes through a point located closest to the second comb tooth portion among the outer edges of the "first comb tooth portion" and is parallel to the second direction and a virtual straight line L2 that passes through a point located closest to the first comb tooth portion among the outer edges of the "second comb tooth portion" and is parallel to the second direction is substantially the same as $\sqrt{3}/2$ times the grain size of the shape anisotropic particles 32 (note that the height of an equilateral triangle is $\sqrt{3}/2$ times the length of one side). In reality, as the plurality of shape-anisotropic particles 32 included in the optical layer 30 have a particle size distribution, it is most preferable that the distance X is substantially equal to $\sqrt{3}/2$ times the mode diameter a of the plurality of shape anisotropic particles 32 (that is, $(\sqrt{3}/2) \cdot a$).

However, even in a case where the distance X is not substantially the same as $(\sqrt{3}/2) \cdot a$, in a case where it is close to $(\sqrt{3}/2) \cdot a$ by some extent, it is possible to sufficiently reduce the ratio of regions in which shape-anisotropic particles 32 are not present. In particular, when the distance X and the mode diameter a satisfy the relationship given by $(0.6) \cdot (\sqrt{3}/2) \cdot a \leq X \leq (1.4) \cdot (\sqrt{3}/2) \cdot a$, the above effect can be achieved. Here, it is preferable that the distance X be set based on the range of the particle size occupying 80% or greater of the whole with the mode diameter a as the center. For example, in a case where the plurality of shape-anisotropic particles 32 have a particle size distribution as indicated in FIG. 8, a frequency of 80% or greater of the whole is occupied in the range of 60% to 140% of the mode diameter a. Therefore, by satisfying the relationship or $(0.6) \cdot (\sqrt{3}/2) \cdot a \leq X \leq (1.4) \cdot (\sqrt{3}/2) \cdot a$, it is possible to favorably obtain the effect of reducing the ratio of regions in which shape-anisotropic particles 32 are not present.

In addition, with regard to each comb tooth portions 11a of the first electrode 11, when considering the two virtual straight lines L1 and L1' passing through the outermost point in the width direction of the outer edge and that are parallel to the second direction D2, the distance W1 between them is preferably the same as the distance X described above. Similarly, with regard to each comb tooth portion 12a of the second electrode 12, when considering the two virtual straight lines L2 and L2' passing through the outermost point in the width direction of the outer edge and that are parallel to the second direction D2, the distance W2 between them is preferably the same as the distance X described above. Note that the distances X, W1, and W2 may be referred to as "inter-line distances" herein.

The shape of the comb tooth portion 11a of the first electrode 11 and the comb tooth portion 12a of the second electrode 12 are not limited to the exampled illustrated in FIG. 19 or elsewhere herein. Hereinafter, variations of the comb tooth portion 114 of the first electrode 11 and the comb tooth portion 12a of the second electrode 12 will be described with reference to FIG. 22A to FIG. 23B.

In the examples illustrated in FIG. 22A and FIG. 22B, each comb tooth portion 11a of the first electrode 11 is not linear but zigzag-shaped, and each comb tooth portion 12a or the second electrode 12 not linear but zigzag-shaped, as well. Also, in the example illustrated in FIG. 22A, the edges (outer edges) of the comb tooth portions 11a and 12a of the first electrode 11 and the second electrode 12 have a polygonal shape. In contrast, in the example illustrated in FIG. 22B, the edges of the comb tooth portions 11a and 12a are wavy-line shaped.

In the examples illustrated in FIG. 22A and FIG. 22B, as neither the comb tooth portions 11a of the first electrode 11 or the comb tooth portion 12a of the second electrode 12 is linear (more particularly, they are zigzag-shaped), the shape in which electrical field concentration occurs is periodically present along the second direction D2, and as a result the strong electric field region RS is periodically formed along the second electrode D2.

Figure 23A:
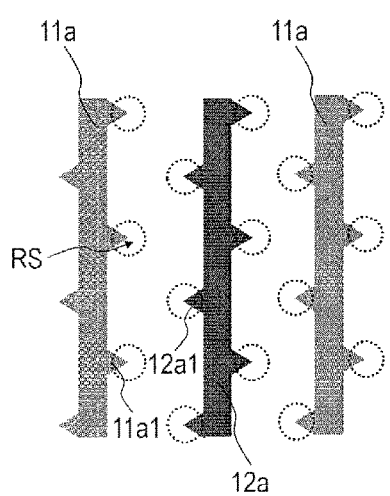
FIG. 23A and FIG. 23B are diagrams illustrating examples of shapes of the comb tooth portion 11a of the first electrode 11 and the comb tooth portion 12a of the second electrode 12.
Figure 23B:
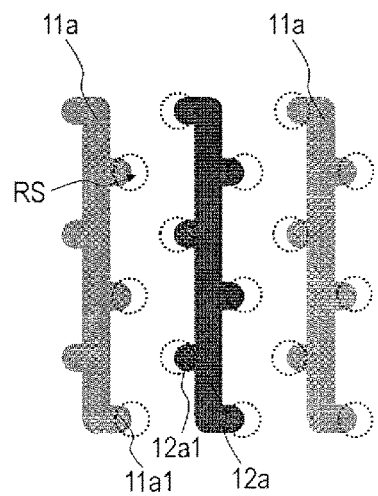

In the examples illustrated in FIG. 23A and FIG. 23B each comb tooth portion 11a of the first electrode 11 is substantially linear, and each comb tooth portion 12a of the second electrode is substantially linear as well. In addition, each comb tooth portions 11a of the first electrode 11 and each comb tooth portion 12a of the second electrode 12 have a plurality of protruding portions 11a1 and 12a1 protruding in a direction that intersects with the second direction D2 (here, a direction orthogonal to the second direction D2). The shape of the plurality of the protruding portions 11a1 and 12a1 are not particularly limited herein. Each of the plurality of protruding portions 11a1 and 12a1 may have be triangular as in the example illustrated in FIG. 23A, or have a semicircular shape as in the example illustrated in FIG. 23B.

In the examples illustrated in FIG. 23A and FIG. 23B, as each comb tooth portion 11a of the first electrode 11 and each comb tooth portion 12a of the second electrode 12 have the plurality of protruding portions 11a1 and 12a1, the shape in which electrical field concentration occurs is periodically present along the second direction D2, and as a result, the strong electric field region RS is periodically formed along the second electrode D2.

Next, a display device 200 according to the present embodiment and a display device having the electrode structure in the related art illustrated in FIG. 36B were actually prototyped (referred to as "Example 2" and "Comparative Example 2", respectively), and the results of the measured reflectivity will be described herein.

Figure 24A:
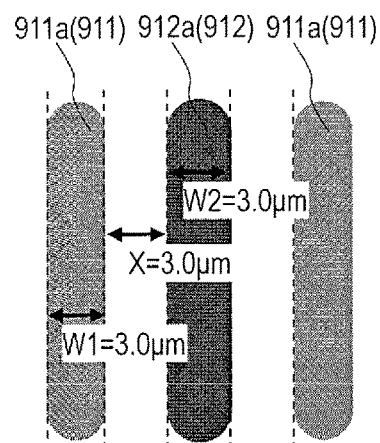
FIG. 24A is a diagram illustrating an electrode structure of Comparative Example 2.
Figure 24B:
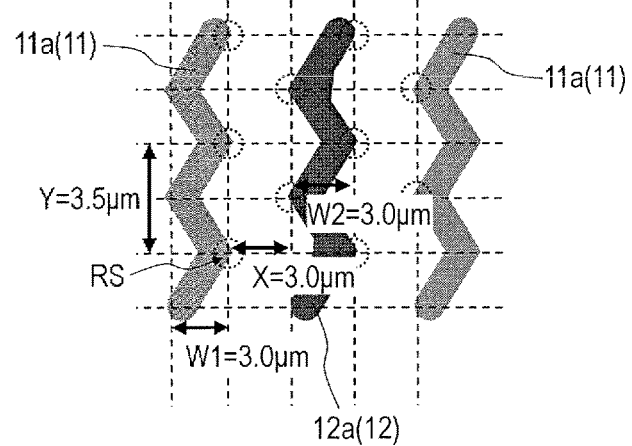
FIG. 24B is a diagram illustrating an electrode structure of Example 2.

FIG. 24A illustrates the electrode structure of Comparative Example 2, and FIG. 24B illustrates the electrode structure of Example 2. In each of Comparative Example 2 and Example 2, the mode diameter a of the plurality of shape-anisotropic particles 32 is 3.5 μm.

In the electrode structure of Comparative Example 2, as illustrated in FIG. 24A, each comb tooth portion 911a of the first electrode 911 is linear, and each comb tooth portion 912a of the second electrode 912 is linear as well. In addition, the inter-line distances X, W1, and W2 are 3.0 μm, respectively, which is $\sqrt{3}/2$ times the mode diameter a of the plurality of shape-anisotropic particles 32.

In the electrode structure of Example 2, as illustrated in FIG. 24B, each comb tooth portions 11a of the first electrode 11 and each comb tooth portion 12a of the second electrode 12 are zigzag-shaped. In addition, the inter-line distances X, W1, and W2 are 3.0 μm as in Comparative Example 1. The period Y of the strong electric field region RS along the second direction D2 is 3.5 μm, which is the same as the mode diameter a of the plurality of shape-anisotropic particles 32.

Figure 25A:
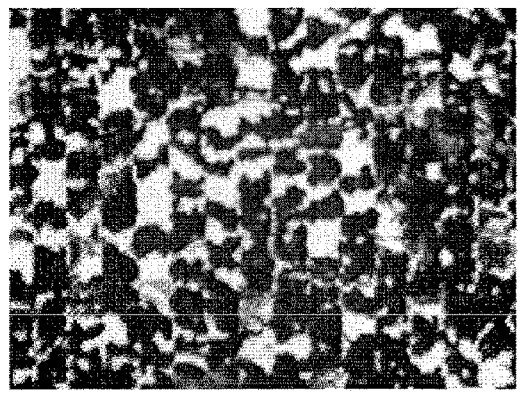
FIG. 25A is an optical microscope image of when a horizontal electrical field is applied to the optical layer of the display device of Comparative Example 2.
Figure 25B:
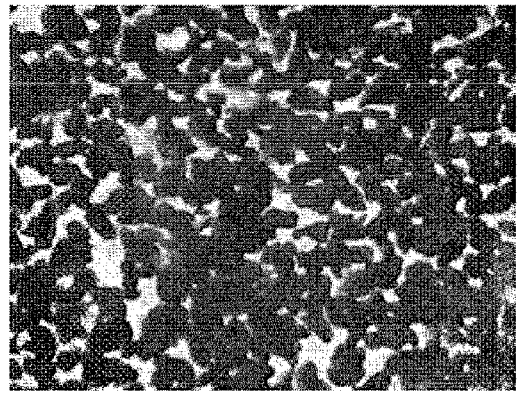
FIG. 25B is an optical microscope image of when a horizontal electrical field is applied to the optical layer 30 of the display device 200 of Example 2.

FIG. 25A illustrates an optical microscope image of when a horizontal electrical field is applied to the optical layer of the display device of Comparative Example 2, and FIG. 25B is an optical microscope image of when a horizontal electrical field is applied to the optical layer 30 of the display device 200 of Example 2. By comparing FIG. 25A and FIG. 25B, it can be understood that in the display device 200 of Example 2, the ratio of regions where collapsed shape-anisotropic particles 32 are not present is lower than that of the display device of Comparative Example 2.

For each of Comparative Example 2 and Example 2, the reflectivity of the SCE method was measured using a d/8 spectrocolorimeter (CM 2002 made by Konica Minolta Co., Ltd.), and the reflectivity was 34.5% in Comparative Example 2 and 41.4% in Example 2. That is, higher reflectivity was obtained in Example 2 than Comparative Example 2.

Next, with respect to the display device 200 of the present embodiment and the display device having the electrode structure in the related art illustrated in FIG. 36B, the results (referred to as "Example 3" and "Comparative Example 3", respectively) of verifying the electrical field distribution at the time of fringe electrical field application using a simulation will be described.

FIG. 26A illustrates the electrode structure of Comparative Example 3, and FIG. 26B illustrates the electrode structure of Example 3.

In the electrode structure of Comparative Example 3, as illustrated in FIG. 26A, each comb tooth portion 911a of the first electrode 911 is linear, and each comb tooth portion 912a of the second electrode 912 is linear as well. Each comb tooth portion 911a of the first electrode 911 and each comb tooth portion 912a of the second electrode 912 have a width of 3.0 µm. The interval between the comb tooth portion 911a having the first electrode 911 and the comb tooth portion 912a of the second electrode 912 adjacent thereto is 6.0 µm.

In the electrode structure of Example 3, as illustrated in FIG. 26A, each comb tooth portion 11a of the first electrode 11 and each comb tooth portion 12a of the second electrode 12 are zigzag-shaped. Each comb tooth portion 11a of the first electrode 11 and each comb tooth portion 12a of the second electrode 12 have a width of 3.0 µm. The interval between the comb tooth portion 11a having the first electrode 11 and the comb tooth portion 12a of the second electrode 12 adjacent thereto is 6.0 µm.

Figure 27A:
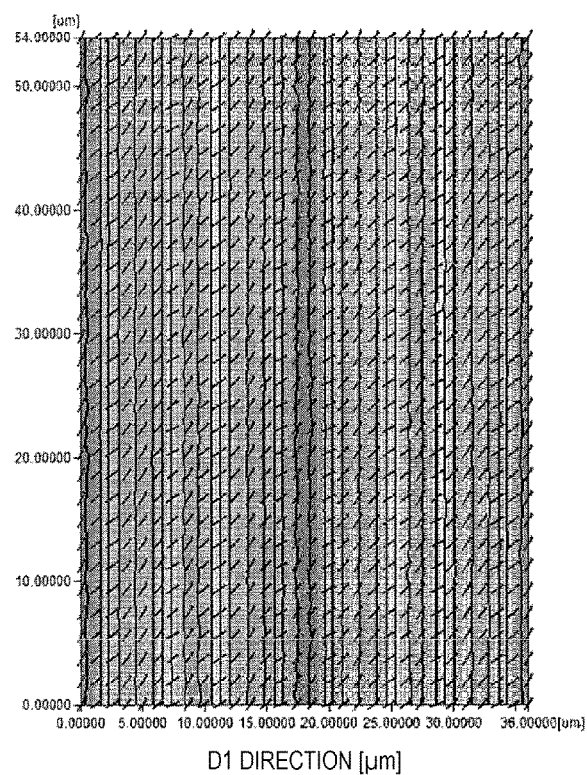
FIG. 27A and FIG. 27B are diagrams illustrating calculated results from simulated alignment directions and equipotential lines of liquid crystal molecules upon application of a fringe electrical field with respect to Comparative Example 3 and Example 3.

FIG. 27A illustrates the alignment direction and equipotential lines of liquid crystal molecules at the time of applying a fringe electrical field in Comparative Example 3 (when the electrical potential of the first electrode 911 is 3.0 V, the electrical potential of the second electrode 912 is −3.0 V the electrical potential of the third electrode 913 is 0 V, and the electrical potential of the not-illustrated counter electrode is 0 V). In the simulation, the dielectric anisotropy Δε of the positive-type liquid crystal material was 5.9 (ε//=8.8, ε⊥=2.9) and the cell gap (the thickness of the optical layer) was 3.2 µm. Further the thickness of each electrode was set to zero. In FIG. 27A, the length along the first direction D1 is 36 µm and the length along the second direction D2 is 54 µm, and the alignment direction and equipotential lines of the liquid crystal molecules are illustrated at a position separated by 1.05 µm from the surface of the substrate provided with the first electrode 911, the second electrode 912, and the third electrode 913.

From FIG. 27A, it can be understood that the equipotential lines are parallel to the comb teeth portions 911a of the first electrode 911 and the comb teeth portions 912a of the second electrode 912, and there is no periodicity of electric field strength along the second direction D2.

Figure 27B:
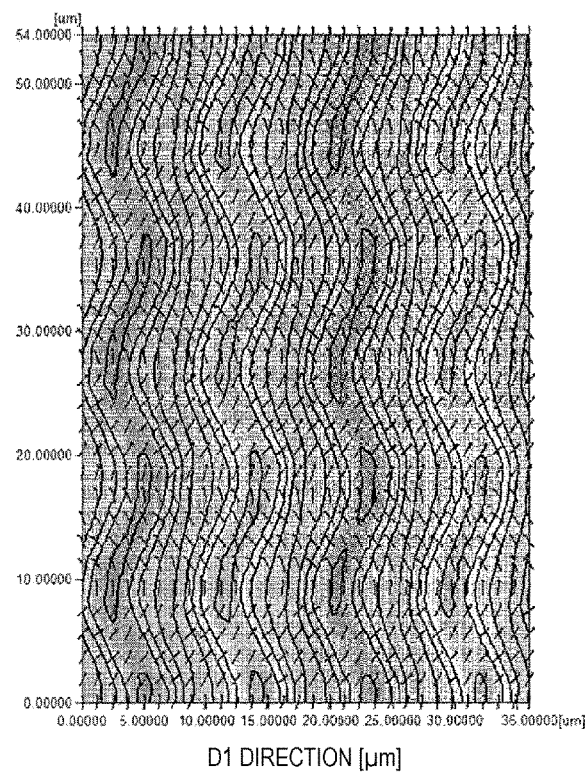

FIG. 27B illustrates the alignment direction and equipotential lines of the liquid crystal molecules 31a at the time of applying a fringe electrical field in Example 3 (when the electrical potential of the first electrode 11 is 3.0 V, the electrical potential of the second electrode 12 is −3.0 V, the electrical potential of the third electrode is 0 V, and the electrical potential of the counter electrode 21 is 0 V). In the simulation, the dielectric anisotropy Δε of the positive-type liquid crystal material was 5.9 (ε//=8.8, ε⊥=2.9) and the cell gap D (the thickness of the optical layer 30) was 3.2 µm. Further the thickness of each electrode was set to zero. In FIG. 27B, the length along the first direction D1 is 36 µm and the length along the second direction D2 is 54 µm, and the alignment direction and equipotential lines of the liquid crystal molecules 31a are illustrated at a position separated by 1.05 µm from the surface of the first substrate 10.

From FIG. 27B, it can be understood that in addition to the equipotential lines extending in parallel to each comb teeth portion 11a of the first electrode 11 and each comb teeth portion 12a of the second electrode 12, tightly closed island-shape equipotential lines are also formed, and the periodicity (periodicity along the second direction D2) of the electric field strength is based on the periodicity (the periodicity along the second direction D2) of the shape of each of the comb teeth portions 11a and 12a.

Note that in the present embodiment, although a configuration was exemplified in which 3 types of electrodes (the first electrode 11, the second electrode 12, and the third electrode 13) for generating the fringe electrical field are provided on the first substrate 10 side, the configuration for generation of the fringe electrical field is not limited to this example.

Figure 28:
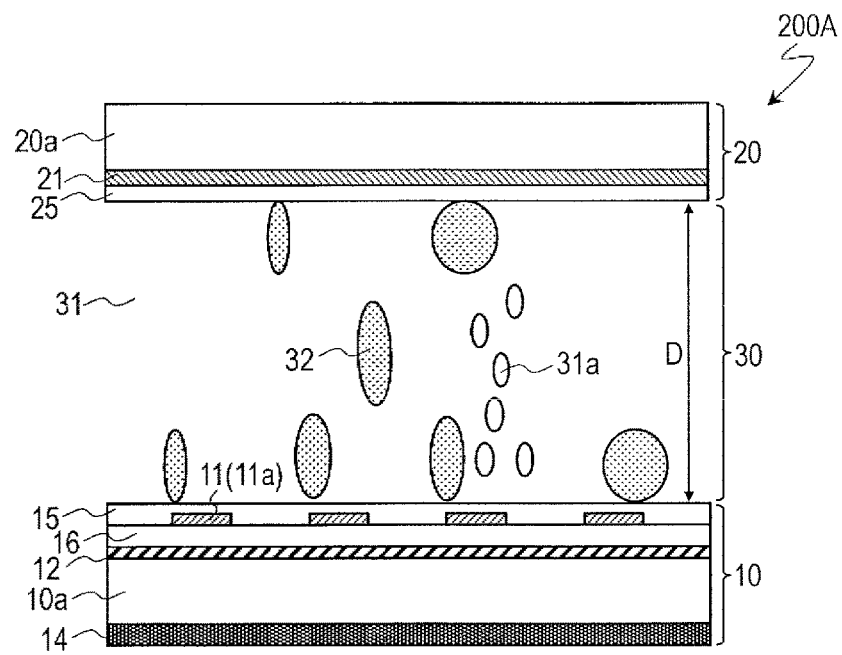
FIG. 28 is a cross-sectional view schematically illustrating a display device 200A according to an embodiment of the present invention.
Figure 29:
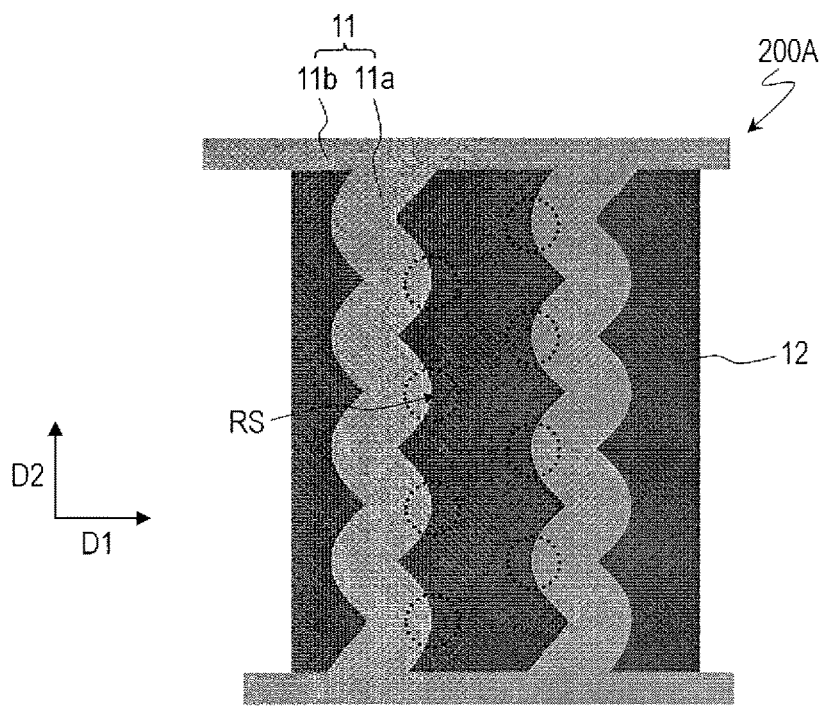
FIG. 29 is a plan view schematically illustrating a display device 200A.

FIG. 28 and FIG. 29 illustrate another display device 200A of the present embodiment. FIG. 28 and FIG. 29 are a cross-sectional view and a plan view schematically illustrating the display device 200A, respectively.

In the display device 200A, the first substrate 10 includes a first electrode 11 and a second electrode 12, and the second electrode 12 is provided below the first electrode 11 with an insulating layer 16 interposed therebetween. The first electrode 11 may include a plurality of comb teeth portions 11a. In contrast, the second electrode 12 may be a solid electrode.

In the display device 200A, a fringe electrical field is generated in the optical layer 30 by the first electrode 11 and the second electrode 12. When the fringe electrical field is applied to the optical layer 30, the strong electric field region RS is periodically formed along the second direction D2 within the pixel of the display device 200A as well, as illustrated in FIG. 29. As such, it is possible to reduce the ratio of regions where the shape-anisotropic particles 32 do not exist in the pixel.

Third Embodiment

Figure 30:
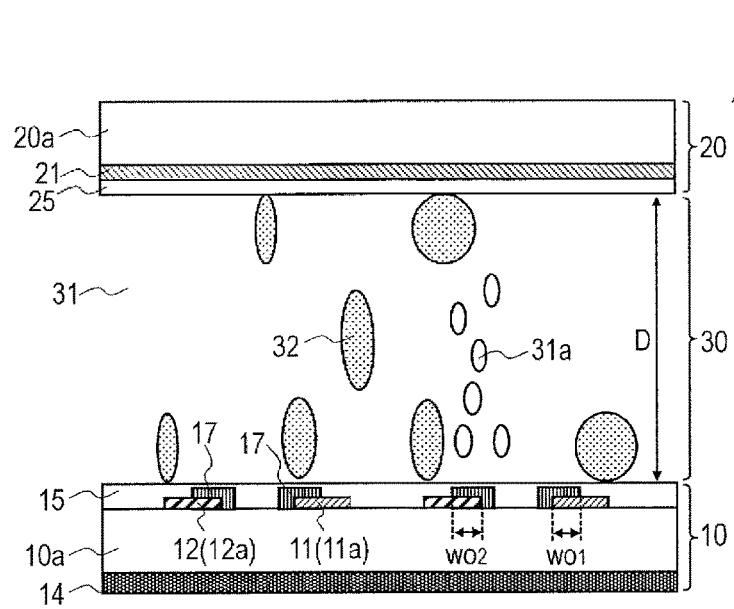
FIG. 30 is a cross-sectional view schematically illustrating a display device 300 according to an embodiment of the present invention, and illustrates a cross section taken along the line 30A-30A' in FIG. 31.
Figure 31:
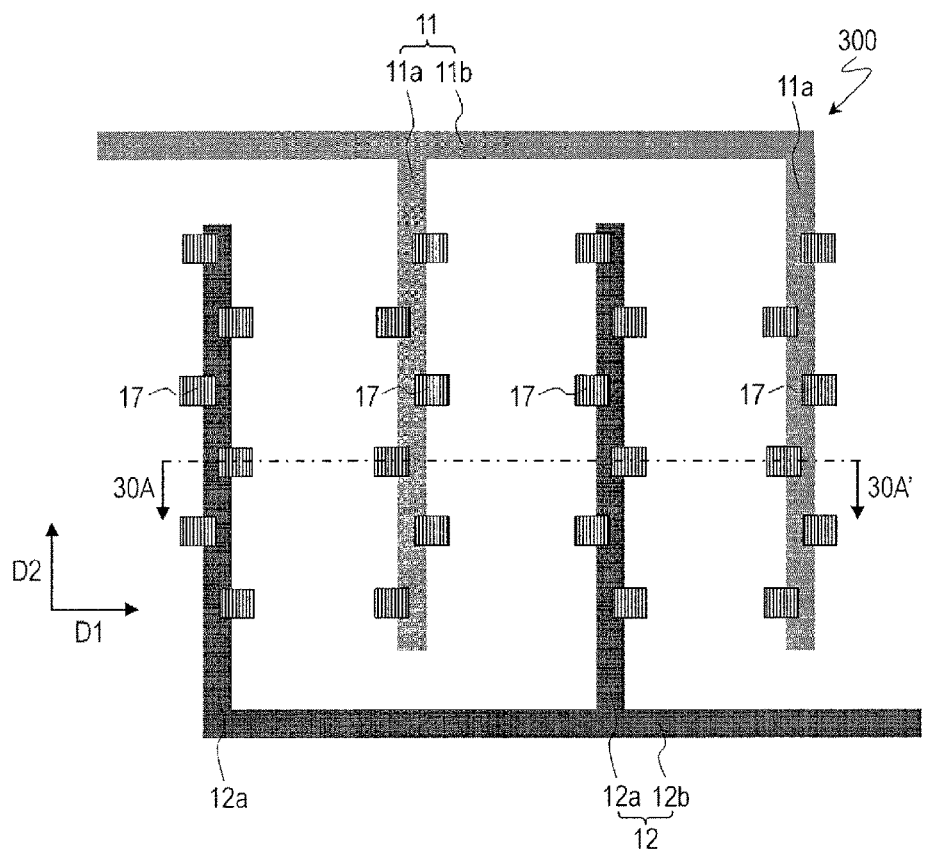
FIG. 31 is a plan view schematically illustrating a display device 300.

FIG. 30 and FIG. 31 illustrate a display device (optical device) 300 according to the present embodiment. FIG. 30 and FIG. 31 are a cross-sectional view and a plan view schematically illustrating the display device 300, respectively. Hereinafter, the description will be focused on the differences between the display device 300 according to the present embodiment and the display device 100 of the first embodiment.

In the display device 300 of the present embodiment, each of the plurality of comb teeth portions 11a of the first electrode 11 is linear, and each of the plurality of comb teeth portions 12a of the second electrode 12 is also linear. Also in the display device 300 of the present embodiment, the first substrate 10 may include a plurality of dielectric layers 17 provided so as to overlap with the outer edge of each comb tooth portion of the first electrode 11 and the outer edge of each comb tooth portion 12a of the second electrode 12. As the material for the plurality of dielectric layers 17, various dielectric materials can be utilized.

Figure 32:
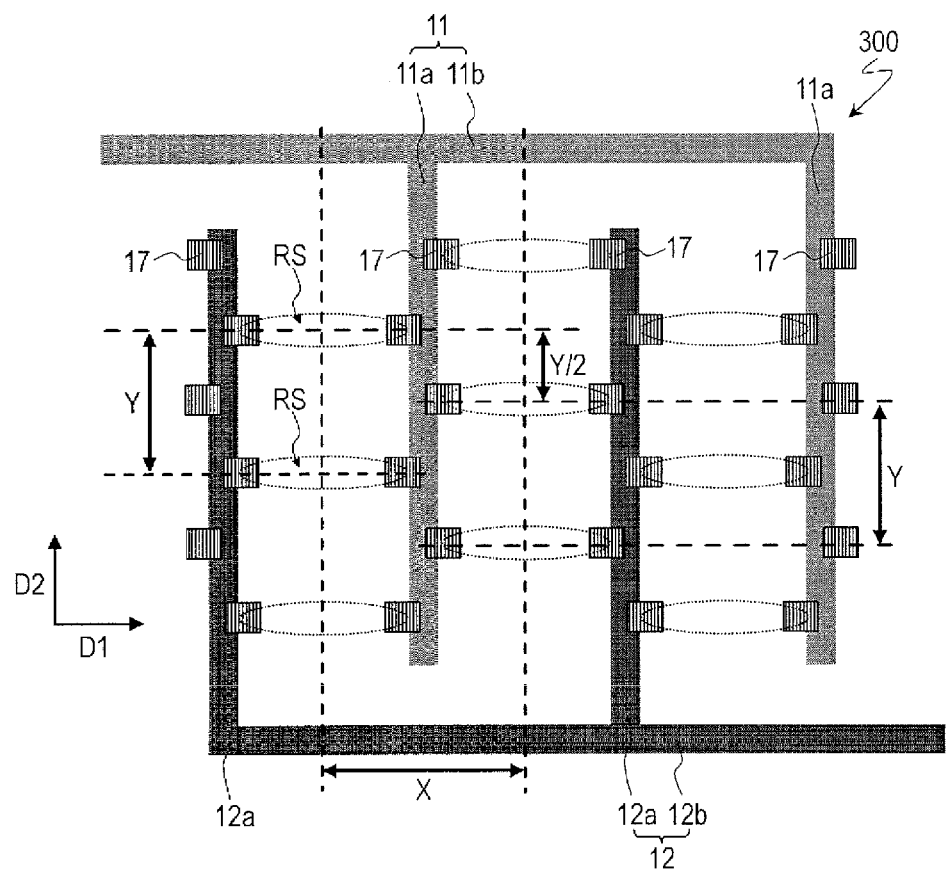
FIG. 32 is a diagram illustrating a strong electric field region RS formed in a pixel of a display device 300 when a horizontal electrical field is applied to the optical layer 30.

The plurality of dielectric layers 17 may have a dielectric constant different from the dielectric constant of the medium 31 of the optical layer 30. Here, the dielectric constant of the plurality of dielectric layers 17 may be greater than the dielectric constant of the medium 31. In addition, when paying attention to each comb tooth portion 11a (or 12a), the dielectric layers 17 may be periodically arranged along the second direction D2. By providing such a dielectric layer 17, the electrostatic capacitance between the comb tooth portion 11a of the first electrode 11 and the comb tooth portion 12a of the second electrode 12 may vary periodically along the second direction D2. Accordingly, when an electrical potential difference is applied between the first electrode 11 and the second electrode 12 (that is, when a horizontal electrical field is applied to the optical layer 30), the pixel of the display device 300 may have an electric field distribution in which a strong electric field region RS having an electric field strength stronger than other regions is periodically formed along the second direction D2, as illustrated in FIG. 32. As can be understood from FIG. 32, as the region in which the plurality of dielectric layers 17 are provided becomes the strong electric field region RS, the plurality of dielectric layers 17 can be said to be arranged in the strong electric field region RS.

In this way, in the display device 300, the strong electric field region RS may be periodically formed along the second direction D2 when the horizontal electrical field is applied to the optical layer 30. Accordingly, immediately after application of the horizontal electrical field to the optical layer 30 (corresponding to FIG. 37B), the center position of the shape anisotropic particles 32 in the second direction D2 (the direction in which the comb teeth portions 11a and 12a extend) is defined by the periodicity of the strong electric field region RS. As such, as the shape-anisotropic particles 32 collapse in a more uniformly distributed manner, it is possible to reduce the ratio of regions in which shape-anisotropic particles 32 are not present. Also, it is possible to reduce both shape-anisotropic particles 32 that remain standing with respect to the substrate surface because there is no space to collapse as well as shape-anisotropic particles 32 that lengthen the time until horizontal alignment is achieved. Accordingly, reflectivity and response speed are improved in the display device 300 of the present embodiment.

Note that the dielectric constant of the plurality of dielectric layers 17 may be lower than the dielectric constant of the medium 31. In the case that the dielectric constant of the plurality of dielectric layers 17 is lower than the dielectric constant of the medium 31, a region where the plurality of dielectric layers 17 are not provided may become the strong electric field region RS. That is, it can be said that the plurality of dielectric layers 17 are arranged in another region (a region other than the strong electric field region RS).

For the same reason as described with respect to the display device 100 in the first embodiment, it is preferable that the period Y of the strong electric field region RS along the second direction D2 and the mode diameter a of the plurality of shape-anisotropic particles 32 satisfy the relationship $(0.6) \cdot a \le Y \le (1.4) \cdot a$. By satisfying this relationship, it is possible to favorably obtain the effect of reducing the ratio of regions in which shape-anisotropic particles 32 are not present.

Herein, for the sake of convenience, a comb tooth portions 11a of the plurality of comb teeth portions 11a of the first electrode 11 will be referred to as a "first comb tooth portion", and two of the comb teeth portions 12a adjacent to the "first comb tooth portion" of the plurality of comb teeth portions 12a of the second electrode 12 will be referred to as a "second comb tooth portion", and a "third comb tooth portion". Also, the region between the "first comb tooth portion" and the "second comb tooth portion", and the region between the "first comb tooth portion" and the "third comb tooth portion" will be referred to as a "slit".

In order for the shape-anisotropic particles 32 to collapse on the substrate surface with as little deviation as possible, it is preferable that the position in the second direction D2 of the strong electric field region RS periodically formed along the second direction D2 between the "first comb tooth portion" and the "second comb tooth portion" and the strong electric field region RS periodically formed along the second direction D2 between the "first comb tooth portion" and the "third comb tooth portion" be shifted by approximately Y/2 as illustrated in FIG. 32. That is, it is preferable that the periodic change of the electric field strength on a certain "slit" and the periodic change of the electric field strength on an adjacent "slit" be out of phase by approximately half a period.

In addition, in order for the shape-anisotropic, particles 32 to collapse on the substrate surface with as little deviation as possible, it is preferable that the distance X along the first direction D1 from the center line between the "first comb tooth portion" and the "second comb tooth portion", and the center line between the "first comb tooth portion" and the "third comb tooth portion" and the mode diameter a of the plurality of shape-anisotropic particles 32 satisfy the relationship $(0.6) \cdot (\sqrt{3}/2) \cdot a \le X \le (1.4) \cdot (\sqrt{3}/2) \cdot a$.

It is preferable that the overlapping width $wo_1$ (see FIG. 30) of each comb tooth portion 11a of the first electrode 11 and the dielectric layer 17 overlapping with them is not less than 20% and not greater than 80% of the width of the comb tooth portion 11a. Similarly, it is preferable that the overlapping width $wo_2$ (see FIG. 30) of each comb tooth portion 12a of the second electrode 12 and the dielectric layer 17 overlapping them is 20% or greater and 80% or less of the width of the comb tooth portion 12a.

Fourth Embodiment

Figure 33A:
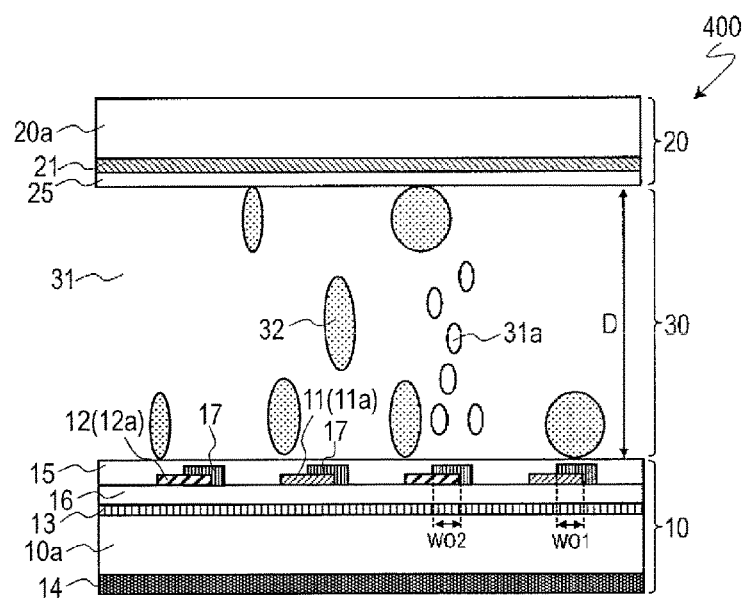
FIG. 33A and FIG. 33B are cross-sectional views schematically illustrating a display device 400 according to an embodiment of the present invention, and illustrate cross sections taken along lines 33A-33A' and 33B-33B' of FIG. 34, respectively.
Figure 33B:
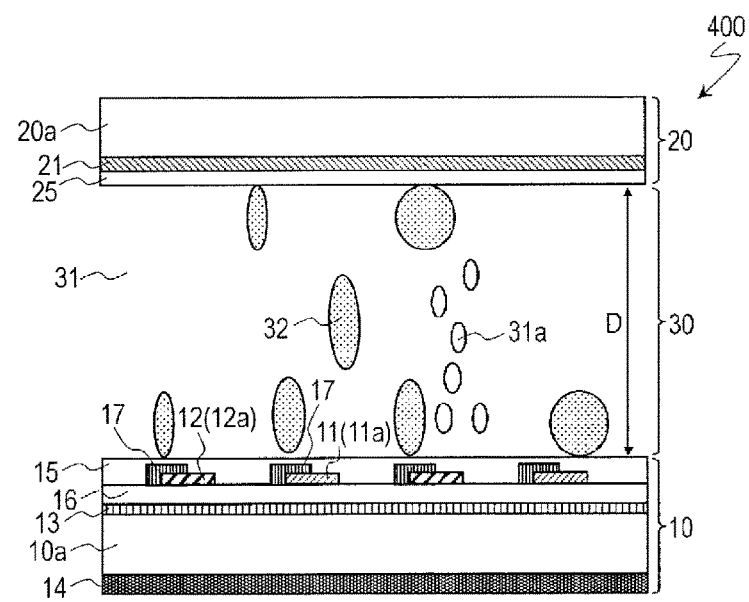
Figure 34:
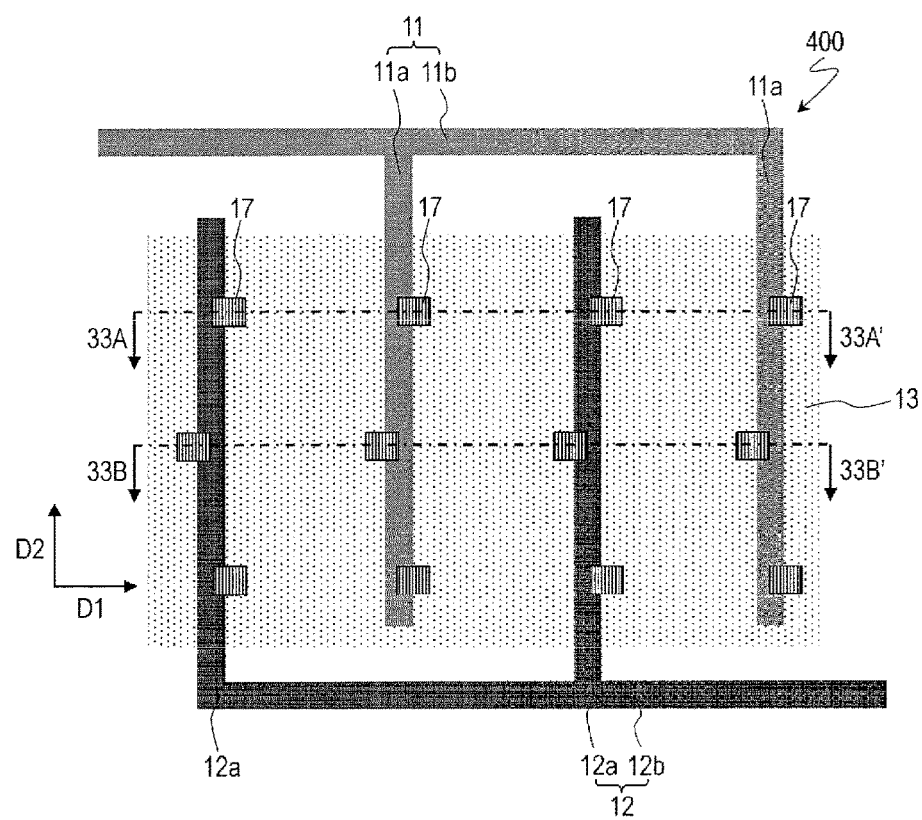
FIG. 34 is a plan view schematically illustrating a display device 400.

FIG. 33A, FIG. 33B, and FIG. 34 illustrate a display device (optical device) 400 according to the present embodiment. FIG. 33A and FIG. 33B are cross-sectional views and FIG. 34 is a plan view schematically illustrating the display device 400, respectively. Hereinafter, the description will be focused on the differences between the display device 400 according to the present embodiment and the display device 200 of the second embodiment.

In the display device 400 of the present embodiment, each of the plurality of comb teeth portions 11a of the first electrode 11 is linear, and each of the plurality of comb teeth portions 12a of the second electrode 12 is also linear. Also in the display device 400 of the present embodiment, the first substrate 10 may include a plurality of dielectric layers 17 provided so as to overlap with the outer edge of each comb tooth portions 11a of the first electrode 11 and the outer edge of each comb tooth portion 12a of the second electrode 12. As the material for the plurality of dielectric layers 17, various dielectric materials can be utilized.

The plurality of dielectric layers 17 may have a dielectric constant different from the dielectric constant of the medium 31 of the optical layer 30. Here, the dielectric constant of the plurality of dielectric layers 17 may be higher than the dielectric constant of the medium 31. In addition, when paying attention to each comb tooth portion 11a (or 12a), the dielectric layers 17 may be periodically arranged along the second direction D2. Also, in the cross section along the first direction D1 (a cross section including the dielectric layer 17), the dielectric layer 17 may be arranged on one side of the two long sides of each comb tooth portions 11a and 12a.

For example, in the cross section illustrated in FIG. 33A, the dielectric layer 17 is disposed on the right side of each comb tooth portion 11a and 12a, and in the cross section illustrated in FIG. 33B, the dielectric layer 17 is disposed on the left side of each comb tooth portions 11a and 12a.

Figure 35:
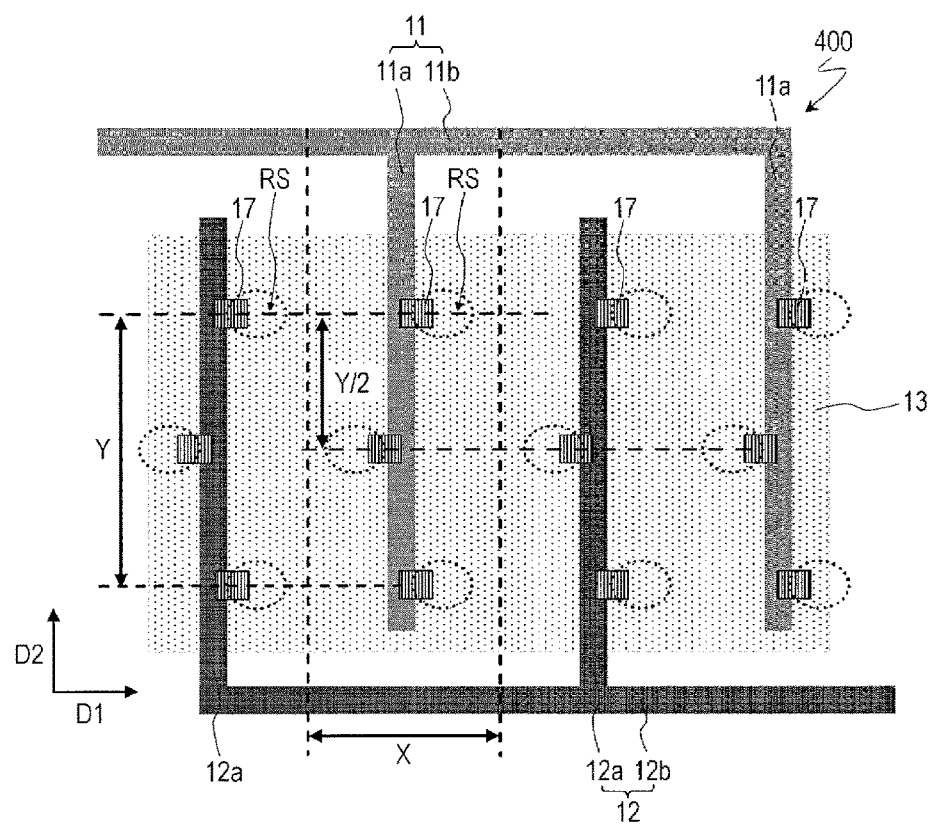
FIG. 35 is a diagram illustrating a strong electric field region RS formed in a pixel of a display device 400 when a fringe electrical field is applied to the optical layer 30.

By providing such a dielectric layer 17, the electrostatic capacitance between the comb tooth portion 11a of the first electrode 11 and the third electrode 13, and the electrostatic capacitance between the comb tooth portion 12a of the second electrode 12 and the third electrode 13 may vary periodically along the second direction D2. Accordingly, when an electrical potential difference is applied between the first electrode 11, the second electrode 12, and the third electrode 13 (that is, when a fringe electrical field is applied to the optical layer 30), the pixels of the display device 400 may have an electric field distribution in which a strong electric field region RS having an electric field strength stronger than other regions is periodically formed along the second direction D2, as illustrated in FIG. 35. As can be understood from FIG. 35, as the region in which the plurality of dielectric layers 17 are provided becomes the strong electric field region RS, the plurality of dielectric layers 17 can be said to be arranged in the strong electric field region RS.

In this way, in the display device 400, the strong electric field region RS may be periodically formed along the second direction D2 when the fringe electrical field is applied to the optical layer 30. Accordingly, immediately after application of the fringe electrical field to the optical layer 30 (corresponding to FIG. 38B), the center position of the shape-anisotropic particles 32 in the second direction D2 (the direction in which the comb teeth portions 11a and 12a extend) is defined by the periodicity of the strong electric field region RS. As such, as the shape-anisotropic particles 32 collapse in a more uniformly distributed manner, it is possible to reduce the ratio of regions in which shape-anisotropic particles 32 are not present. Also, it is possible to reduce both shape-anisotropic particles 32 that remain standing with respect to the substrate surface because there is no space to collapse as well as shape-anisotropic particles 32 that lengthen the time until horizontal alignment is achieved. Accordingly, reflectivity and response speed are improved in the display device 400 of the present embodiment.

Note that the dielectric constant of the plurality of dielectric layers 17 may be lower than the dielectric constant of the medium 31. In the case that the dielectric constant of the plurality of dielectric layers 17 is lower than the dielectric constant of the medium 31, a region where the plurality of dielectric layers 17 are not provided may become the strong electric field region RS. That is, it can be said that the plurality of dielectric layers 17 are arranged in another region (a region other than the strong electric field region RS).

For the same reason as described with respect to the display device 200 in the second embodiment, it is preferable that the period Y of the strong electric field region RS along the second direction D2 and the mode diameter a of the plurality of shape-anisotropic particles 32 satisfy the relationship $(0.6) \cdot a \leq Y \leq (1.4) \cdot a$. By satisfying this relationship, it is possible to favorably obtain the effect of reducing the ratio of regions in which shape-anisotropic particles 32 are not present.

Herein, for the sake of convenience, a comb tooth portion 11a of the plurality of comb teeth portions 11a of the first electrode 11 will be referred to as a "first comb tooth portion", and two of the comb teeth portions 12a adjacent to the "first comb tooth portion" of the plurality of comb teeth portions 12a of the second electrode 12 will be referred to as a "second comb tooth portion", and a "third comb tooth portion". Also, the region between the "first comb tooth portion" and the "second comb tooth portion", and the region between the "first comb tooth portion" and the "third comb tooth portion" will be referred to as a "slit".

In order for the shape-anisotropic particles 32 to collapse on the substrate surface with as little deviation as possible, it is preferable that the position in the second direction D2 of the strong electric field region RS periodically formed along the second direction D2 on the "second comb tooth portion" side of the "first comb tooth portion", and the strong electric field region RS periodically formed along the second direction D2 on the "first comb tooth portion" side of the "second comb tooth portion" be shifted by approximately Y/2 as illustrated in FIG. 35. That is, it is preferable that the periodic change of the electric field strength on a certain "slit" and the periodic change of the electric field strength on an adjacent "slit" be out of phase by approximately half a period.

In addition, in order for the shape-anisotropic particles 32 to collapse on the substrate surface with as little deviation as possible, it is preferable that the distance X along the first direction D1 from the center line between the "first comb tooth portion" and the "second comb tooth portion", and the center line between the "first comb tooth portion" and the "third comb tooth portion" and the mode diameter a of the plurality of shape-anisotropic particles 32 satisfy the relationship $(0.6) \cdot (\sqrt{3}/2) \cdot a \leq X \leq (1.4) \cdot (\sqrt{3}/2) \cdot a$.

It is preferable that the overlapping width $wo_1$ (see FIG. 33A) of each comb tooth portion 11a of the first electrode 11 and the dielectric layer 17 overlapping with them is not less than 20% and not greater than 80% of the width of the comb tooth portion 11a. Similarly, it is preferable that the overlapping width $wo_2$ (see FIG. 33A) of each comb tooth portion 12a of the second electrode 12 and the dielectric layer 17 overlapping them is 20% or greater and 80% or less of the width of the comb tooth portion 12a.

Other Configurations

Although a counter electrode 21 is provided on the second substrate 20 side in the embodiments described above, the counter electrode 21 may be omitted. This is because the shape-anisotropic particles 32 assume a vertical alignment state as a result of setting the optical layer 30 to an electrical field non-applied state. However, from the viewpoint of response speed, it is preferable to utilize a configuration in which the counter electrode 21 is provided on the second substrate 20 side (that is, a configuration in which a vertical electrical field can be applied to the optical layer 30). That is, it is preferable to perform display by interchanging between a state in which a vertical electrical field is generated in the optical layer 30 and a state in which a horizontal electrical field and/or a fringe electrical field is generated in the optical layer 30. As the change from the former state to the latter state as well as the change from the latter state to the former state are both performed by changing the direction of the applied electric field, a sufficient response speed can be achieved.

Also, in the above-mentioned embodiments, a liquid crystal material may be used as the medium 31, but the medium 31 may be a material other than a liquid crystal material (e.g., a medium exemplified in PTL 2, such as propylene carbonate). The medium 31 may preferably be a material having high transparency to visible light. In addition, from the viewpoint of response characteristics, the viscosity of the medium 31 may preferably be 200 mPa·s or less.

When a liquid crystal material is used as the medium 31, it may be preferable that the liquid crystal material be a positive type. In the case that the liquid crystal material is a positive type, the behavior of the shape-anisotropic particles 32 when an electrical field is applied to the optical layer 30 coincides with the behavior of the liquid crystal molecules 31. For example, when the electrical field applied to the optical layer 30 is switched from a horizontal electrical field to a vertical electrical field, the shape-anisotropic particles 32 attempt to change from a horizontal alignment state to a vertical alignment state, and the liquid crystal molecules 31a also attempt to change from a horizontal alignment state to a vertical alignment state. Accordingly, as the number (existence probability) of shape-anisotropic particles 32 properly oriented vertically can be increased, a higher contrast ratio can be achieved.

As the material for the positive-type liquid crystal material, a liquid crystal material for a liquid crystal display device can be extensively and suitably used. For example, a fluorine-based liquid crystal material in which fluorine is introduced into a side chain can be suitably used. Fluorine-based liquid crystal materials are often used in passive matrix-driven liquid crystal display devices, and have high dielectric anisotropy and high specific resistance. In particular, for example, a liquid crystal material having a dielectric constant $\varepsilon_{//}$ in the major axis direction of 24.7, a dielectric constant $\varepsilon\perp$ in the minor axis direction of 4.3, and a resistivity $\rho$ of $6\times10^{13}$ $\Omega$·cm can be used. Of course, the dielectric constant and specific resistance of the liquid crystal material are not limited to the examples provided herein. From the viewpoint of sufficiently suppressing the occurrence of off-leakage through the medium 31, it may be preferable for the specific resistance of the liquid crystal material to be $1\times10^{11}$ or $1\times10^{12}$ $\Omega$·cm or greater. Also, it may be preferable that the dielectric anisotropy $\Delta\varepsilon$ of the liquid crystal material exceeds 10 ($\Delta\varepsilon>10$).

Note that a liquid crystal material having a negative dielectric anisotropy (that is, a negative-type liquid crystal material) may also be used as the medium 31.

The shape and material of the shape-anisotropic particles 32 are not particularly limited, provided that the projected area on the substrate surface changes according to the applied voltage (the direction of the applied electrical field) as described above. The shape anisotropic member 32 may have a flake-shape (thin-sliced shape), a column shape, or an elliptical sphere shape. From the viewpoint of achieving a high contrast ratio, it is preferable that the shape-anisotropic particles 32 have a shape such that the ratio of the maximum projected area to the minimum projected area is 2:1 or greater.

As the material of the shape-anisotropic particles 32, a metal material, a semiconductor material, a dielectric material, or a composite material thereof can be mused. In addition, the shape-anisotropic particles 32 may be a dielectric multilayer film or a cholesteric resin material. In the event that a metal material is used as the material of the shape-anisotropic particles 32, it may be preferable that an insulating layer (dielectric layer) be formed on the surface of the shape-anisotropic particles 32. Although the dielectric constant of a metal body is an imaginary number, by forming an insulating layer (for example, a resin layer or a metal oxide layer) on the surface, it is possible for shape-anisotropic particles 32 formed from the metal material to be treated as a dielectric. In addition, by forming an insulating layer on the surface, it is also possible to achieve effects such as preventing conduction due to contact between shape-anisotropic particles 32 formed from a metal material, or preventing aggregation due to physical interaction. As an example, aluminum flakes coated with a resin material (for example, acrylic resin) on their surface can be used as the shape-anisotropic particles 32. The aluminum flake content of the optical layer 30 may, for example, be 6 wt %. Alternatively, aluminum flakes having an $SiO_2$ layer formed on their surface, or aluminum flakes having an aluminum oxide layer formed on their surface may be used. Of course, metal materials other than aluminum may also be used as the metal material. In addition, the shape-anisotropic particles 32 may be colored.

The particle diameter of the shape-anisotropic particles 32 is not particularly limited herein. The mode diameter a of the shape-anisotropic particles 32 may, for example, be from 5 µm to 30 µm.

The specific gravity of the shape-anisotropic particles 32 is preferably 11 g/cm$^3$ or less, more preferably 3 g/cm$^3$ or less, and still more preferably the same specific gravity as the medium 31. This is because, in a case where the specific gravity of the shape-anisotropic particles 32 significantly differs from the specific gravity of the medium 31, problems may arise wherein the shape-anisotropic particles 32 sink or float. Also, from the viewpoint of increasing the effect of moving the shape-anisotropic particles 32 by the oscillation of the medium 31, it is preferable that the shape-anisotropic particles 32 be lightweight.

Note that although a configuration was exemplified in which an active matrix substrate is disposed on the rear side in the above description, the arrangement of the first substrate 10 is not limited to this example. The first substrate 10 may be arranged on the front side. As the first substrate 10, which is an active matrix substrate, includes constituent elements formed from a material having light blocking characteristics, when a configuration in which the first substrate 10 is disposed on the rear side is utilized, the reflective effect of the shape-anisotropic particles 32 can be leveraged to the maximum degree.

Also, although a reflection type display device 100 was described as an example in the above description, embodiments of the present invention may also suitably be used for a transmissive display device (or a transmission reflection dual type transparent display device). In the transmission display device, the light absorbing layer (the light absorbing layer 14 illustrated in FIG. 1 and elsewhere) is not provided on the substrate on the rear side. Also, in the transmission display device, an illumination element (backlight) for irradiating light to the display panel may be provided.

Fifth Embodiment

Figure 41:
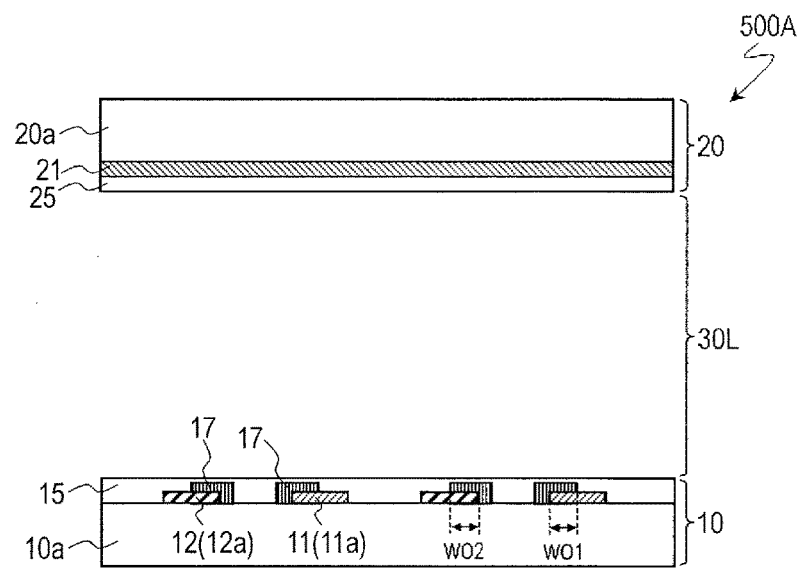
FIG. 41 is a cross-sectional view schematically illustrating a display device 500A according to an embodiment of the present invention, and illustrates a cross section taken along the line 41A-41A' of FIG. 42.
Figure 42:
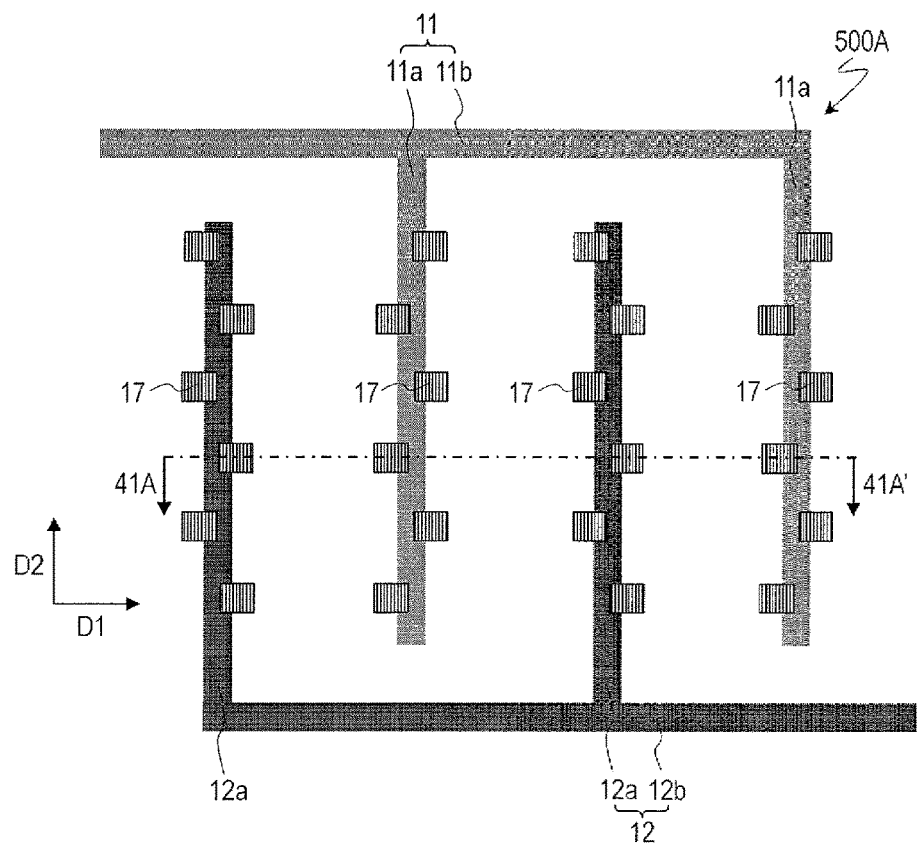
FIG. 42 is a plan view schematically illustrating a display device 500A.
Figure 43A:
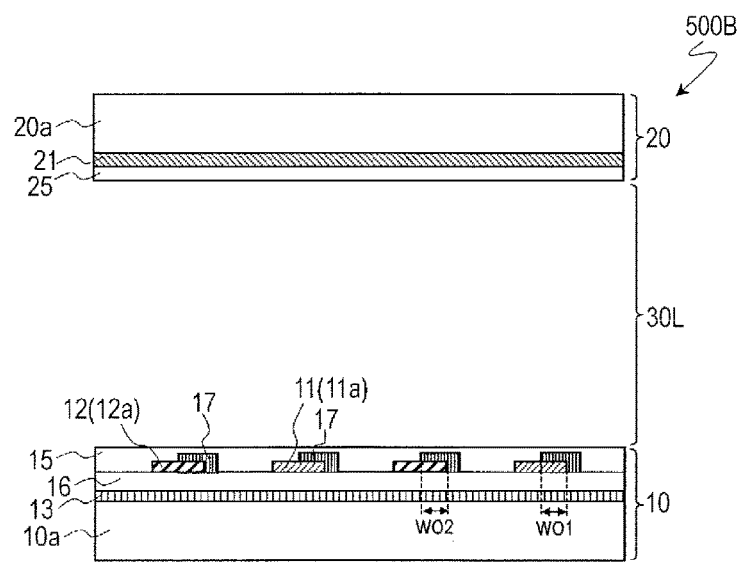
FIG. 43A and FIG. 43B are cross-sectional views schematically illustrating a display device 500B according to an embodiment of the present invention, and illustrate cross sections taken along lines 43A-43A' and 43B-43B' of FIG. 44, respectively.
Figure 43B:
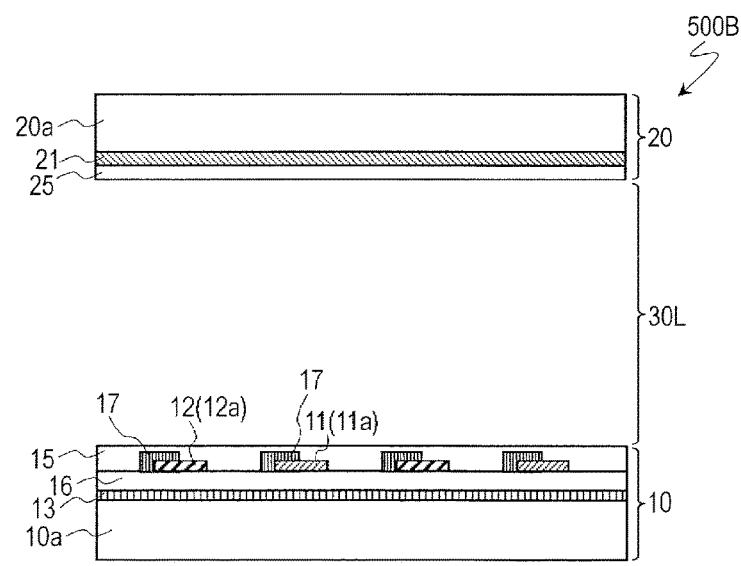
Figure 44:
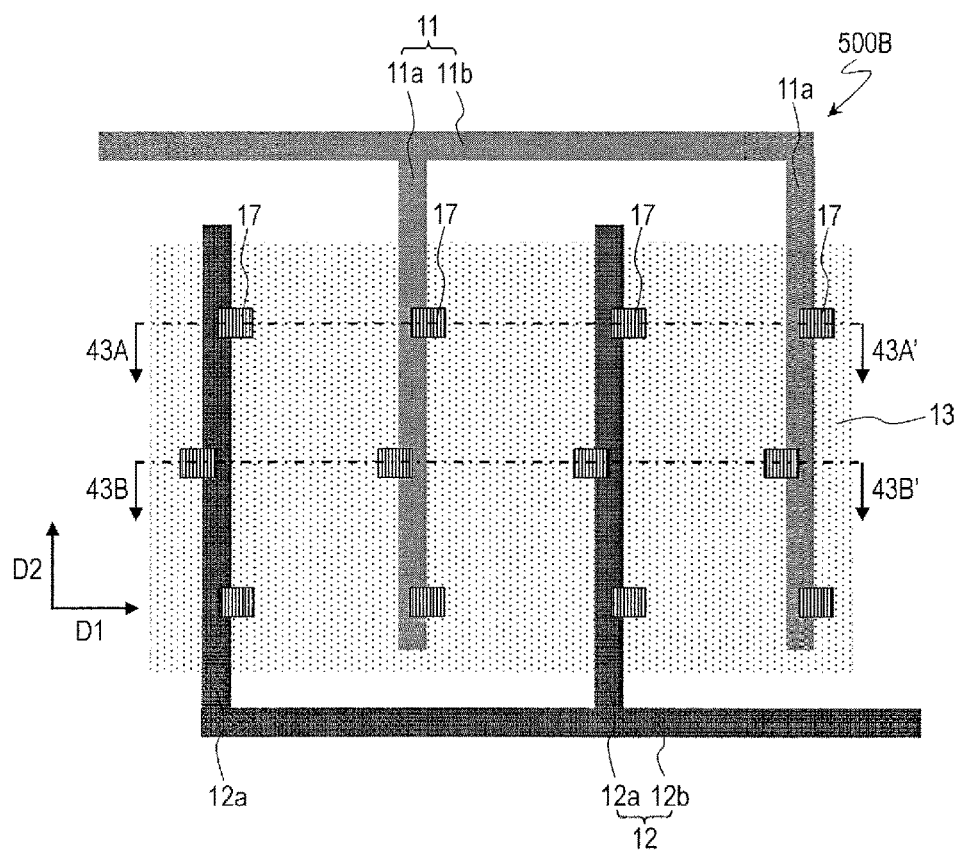
FIG. 44 is a plan view schematically illustrating a display device 500B.

FIG. 41 to FIG. 44 illustrate the display devices 500A and 500B of the present embodiment. FIG. 41 and FIG. 42 are a cross-sectional view and a plan view schematically illustrating the display device 500A, respectively. Also, FIG. 43A and FIG. 43B are a cross-sectional views and FIG. 44 is a plan view schematically illustrating the display device 500B, respectively. Hereinafter, the description will be focused on the differences between the display devices 500A and 500B of the present embodiment and the display devices 300 and 400 of the third and fourth embodiments.

As illustrated in FIG. 41, the display device 500A differs from the display device 300 of the third embodiment in that it includes a liquid crystal layer 301, that does not include the shape-anisotropic particles 32 in place of the optical layer 30. In addition, as illustrated in FIG. 43A and FIG. 43B, the display device 500B differs from the display device 400 of the fourth embodiment in that it includes a liquid crystal layer 30L that does not include the shape-anisotropic particles 32 in place of the optical layer 30. That is, the display devices 500A and 500B are liquid crystal display devices. The liquid crystal layer 30L may be made from a positive-type liquid crystal material. The display devices 500A and 500B may have a pair of polarizing plates (not illustrated) opposing each other with the liquid crystal layer 30L interposed therebetween. In addition, in the case that display is performed in the transmission mode, the display devices 500A and 500B may include an illumination device (backlight) provided on the rear side of the liquid crystal layer 30L and in the case that display is performed in the reflective mode, the display devices 500A and 500B may include a light reflective layer provided on the rear side of the liquid crystal layer 30L.

As illustrated in FIG. 41 and FIG. 42, in the display device 500A, similar to the display device 300 of the third embodiment, the first substrate 10 may include a plurality of dielectric layers 17 provided so as to overlap with the outer edge of each comb tooth portion 11a of the first electrode 11 and the outer edge of each comb tooth portion 12a of the second electrode 12. The plurality of dielectric layers 17 may have a dielectric constant different from the dielectric constant of the liquid crystal material constituting the liquid crystal layer 30L. Here, the dielectric constant of the plurality of dielectric layers 17 may be higher than the dielectric constant of the liquid crystal material (the dielectric constant in the major axis direction $\varepsilon_{//}$).

Figure 45:
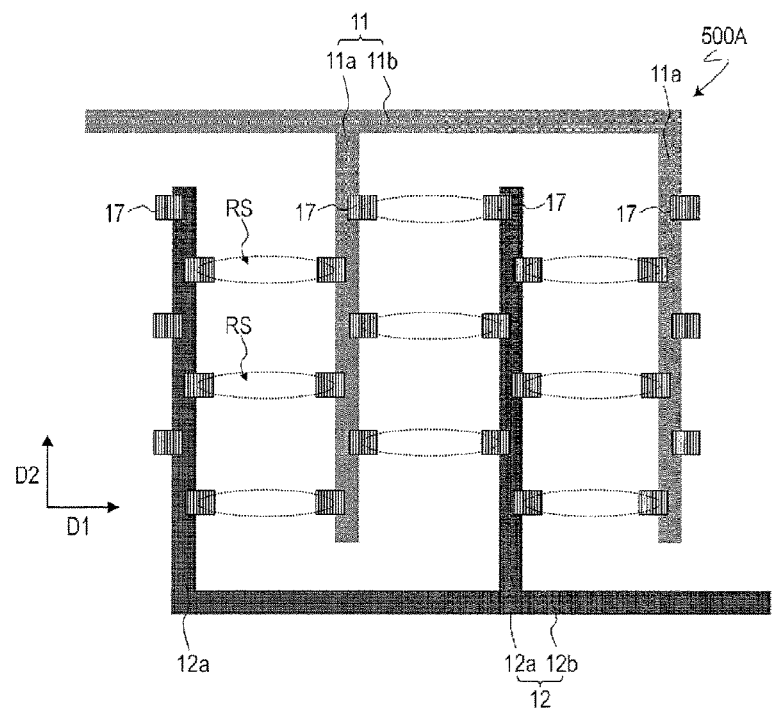
FIG. 45 is a diagram illustrating a strong electric field region RS formed in a pixel of a display device 500A when a horizontal electrical field is applied to a liquid crystal layer 30L.

Accordingly, when an electrical potential difference is applied between the first electrode 11 and the second electrode 12 (that is, when a horizontal electrical field is applied to the liquid crystal layer 30L), the pixels of the display device 500A may have an electric field distribution in which a strong electric field region RS having an electric field strength stronger than other regions is periodically formed along the second direction D2, as illustrated in FIG. 45. As a result, as more liquid crystal molecules can be collapsed (tilted), the optical characteristics (transmittance or reflectivity) and response speed may be improved in the display device 500A.

Also, in the display device 500B of the present embodiment, as illustrated in FIG. 43A, FIG. 43B, and FIG. 44, the first substrate 10 may include a plurality of dielectric layers 17 provided so as to overlap with the outer edge of each comb tooth portion 11a of the first electrode 11 and the outer edge of each comb tooth portion 12a of the second electrode 12, similar to the display device 400 of the fourth embodiment. The plurality of dielectric layers 17 may have a dielectric constant different from the dielectric constant of liquid crystal material constituting the liquid crystal layer 30L. Here, the dielectric constant of the plurality of dielectric layers 17 may be higher than the dielectric constant of the liquid crystal material (the dielectric constant in the major axis direction $\varepsilon_{//}$).

Figure 46:
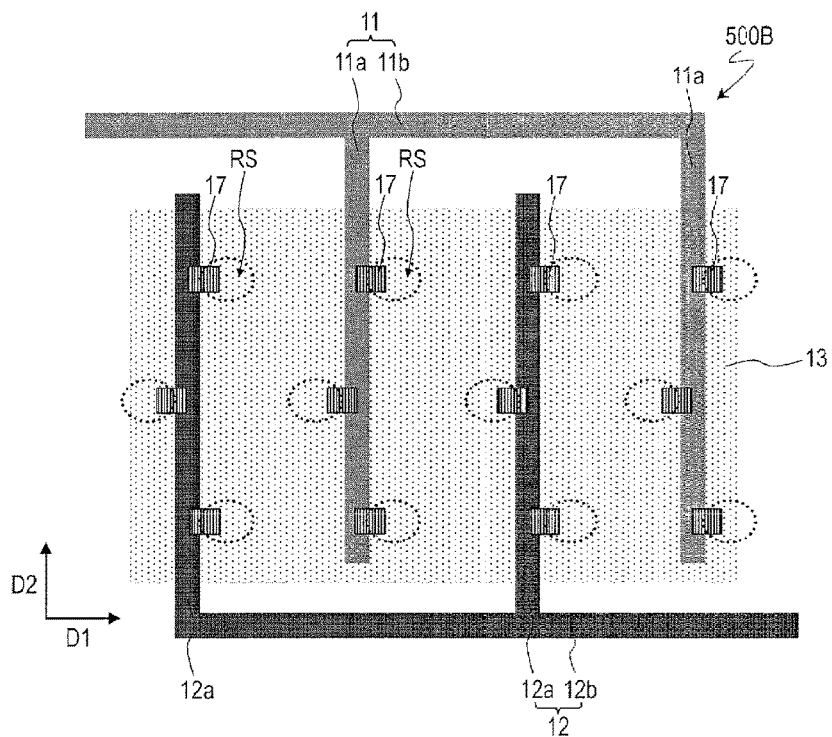
FIG. 46 is a diagram illustrating a strong electric field region RS formed in a pixel of a display device 500B when a fringe electrical field is applied to a liquid crystal layer 30L.

Accordingly, when an electrical potential difference is applied between the first electrode 11, the second electrode 12, and the third electrode 13 (that is, when a fringe electrical field is applied to the liquid crystal layer 30L), the pixels of the display device 500B may have an electric field distribution in which a strong electric field region RS having an electric field strength stronger than other regions is periodically formed along the second direction D2, as illustrated in FIG. 46. As a result, as more liquid crystal molecules can be collapsed (tilted), the optical characteristics (transmittance or reflectivity) and response speed may be improved in the display device 500B.

Next, with respect to the display device 500A of the present embodiment and the above-described horizontal electrical field mode liquid crystal display device in the related art that does not include a dielectric layer 17, the results (referred to as "Example 4" and "Comparative Example 4", respectively) of verifying the electrical field distribution at the time of fringe electrical field application using a simulation will be described.

Figure 47:
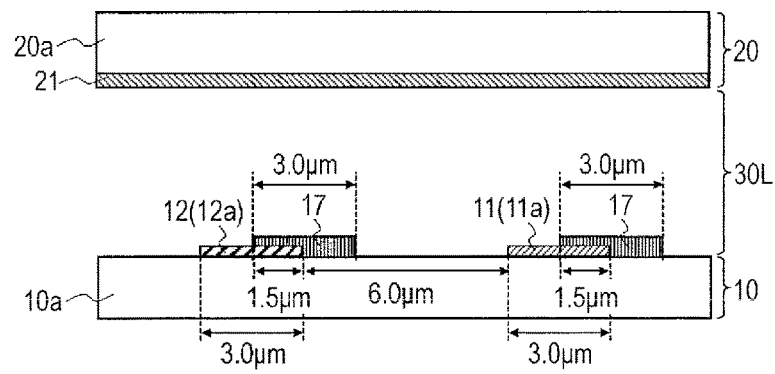
FIG. 47 is a diagram illustrating an electrode structure of Example 4.

FIG. 47 illustrates the electrode structure of Example 4. In the electrode structure of Example 4, as illustrated in FIG. 47, each comb tooth portions 11a of the first electrode 11 and each comb tooth portion 12a of the second electrode 12 have a width of 3.0 μm, and the interval between the comb tooth portion 11a having the first electrode 11 and the comb tooth portion 12a of the second electrode 12 adjacent thereto is 6.0 μm. Also, the width of the dielectric layer 17 may be 3.0 μm. The overlapping width $wo_1$ of each comb tooth portion 11a of the first electrode 11 and the dielectric layer 17 overlapping with them is 1.5 μm, and the overlapping width $wo_2$ of each comb tooth portion 12a of the second electrode 12 and the dielectric layer 17 overlapping with them is also 1.5 μm.

The electrode structure of Comparative Example 4 may be the same as the electrode structure of Example 4 except that the dielectric layer 17 is omitted.

Figure 48A:
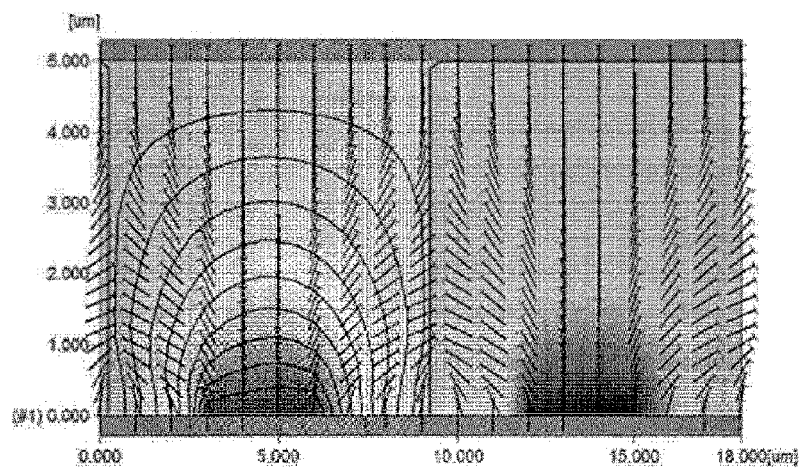
FIG. 48A and FIG. 48B are diagrams illustrating calculated results from simulated alignment directions and equipotential lines of liquid crystal molecules upon application of a horizontal electrical field with respect to Comparative Example 4 and Example 4.
Figure 48B:
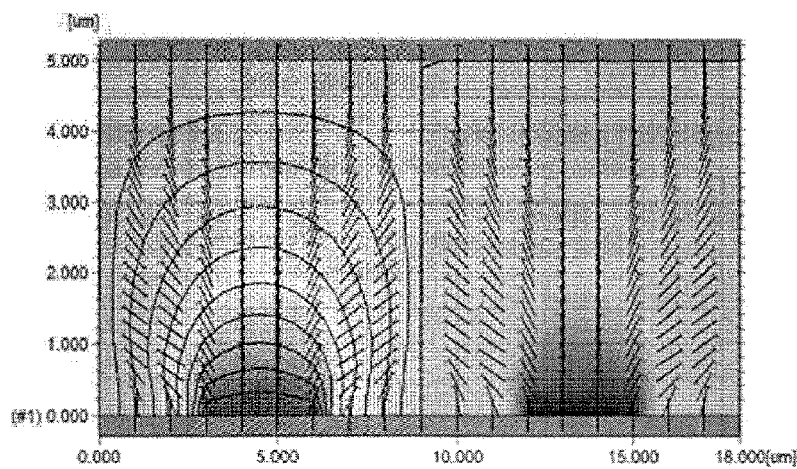

With regard to Example 4 and Comparative Example 4, FIG. 48A and FIG. 48B illustrate the alignment directions and equipotential lines of liquid crystal molecules at the time of applying a horizontal electrical field (when the electrical potential of the first electrode 11 is −5.0 V, the electrical potential of the second electrode 12 is 5.0 V, and the electrical potential of the counter electrode 21 is 0 V). In the simulation, the dielectric anisotropy Δε of the positive-type liquid crystal material was 7.0 ($\varepsilon_{//}$=10.1, $\varepsilon\perp$=3.1), the dielectric constant of the dielectric layer 17 was 20.0, and the cell gap (the thickness of the liquid crystal layer 30L) was 5.0 μm. Further the thickness of each electrode was set to zero, and the thickness of the dielectric layer 17 was set to 0.1 μm.

By comparing FIG. 48A (Example 4) and FIG. 48B (Comparative Example 4), it can be understood that in the electrode structure of Example 4, more liquid crystal molecules collapse than in the electrode structure of Comparative Example 4.

INDUSTRIAL APPLICABILITY

According to the embodiments of the present invention, in an optical device having an optical layer including shape-anisotropic particles, it is possible to reduce the ratio of regions in which shape-anisotropic particles are not present in pixels.

The optical device according to the embodiments of the present invention may be suitably used as a display device. In addition, the optical device according to the embodiments of the present invention can also be used as various optical devices other than display devices (optical switches, etc.).

REFERENCE SIGNS LIST

10 First substrate
10a Substrate
11 First electrode
11a Comb tooth portion of the first electrode (branch portion)
11b Connecting portion of the first electrode (trunk portion)
12 Second electrode 12a Comb tooth portion of the second electrode (branch portion)
12b Connecting portion of the second electrode (trunk portion)
13 Third electrode
14 Light absorbing layer
15, 25 Vertical alignment film
16 Insulating layer
17 Dielectric layer
20 Second Substrate
20a Substrate
21 Counter electrode
30 Optical layer (display medium layer)
30L Liquid crystal layer
31 Medium (liquid crystal material)
31a Liquid crystal molecule
32 Shape-anisotropic particle
100, 200, 200A, 300, 400 Display device (optical device)
500A, 500B Display device (liquid crystal display device)

The invention claimed is:

1. An optical device comprising:
a first substrate and a second substrate provided opposed to each other; and
an optical layer provided between the first substrate and the second substrate,
wherein the optical layer includes a pixel,
the first substrate includes, in the pixel, a first electrode and a second electrode configured to be provided with mutually different electrical potentials,
the optical layer includes a medium and a plurality of shape-anisotropic particles having shape anisotropy diffused in the medium,
at least one of the first electrode and the second electrode includes a plurality of comb teeth portions disposed at predetermined intervals along a first direction, and
when an electrical potential difference is applied between the first electrode and the second electrode, the pixel is configured to have an electrical field distribution in which a strong electric field region having a stronger field intensity than another region is periodically formed parallel to a surface of the optical layer along a second direction orthogonal to the first direction.

2. The optical device according to claim 1,
wherein each of the first electrode and the second electrode include the plurality of comb teeth portions;
the first electrode and the second electrode are arranged such that the plurality of comb teeth portions engage with each other; and
a horizontal electrical field is generated in the optical layer by the first electrode and the second electrode.

3. The optical device according to claim 2,
wherein a period Y of the strong electric field region along the second direction and a mode diameter a of the plurality of shape-anisotropic particles satisfy a relationship $(0.6)\cdot a \leq Y \leq (1.4)\cdot a$.

4. The optical device according to claim 2,
wherein a particular comb tooth portion of the plurality of comb teeth portions of the first electrode is denoted as a first comb tooth portion and two comb teeth portions of the plurality of comb teeth portions of the second electrode that are adjacent to the first comb tooth portion are denoted as a second comb tooth portion and a third comb tooth portion; and
the position in the second direction of both the strong electric field region periodically formed between the first comb tooth portion and the second comb tooth portion along the second direction and the strong electric field region periodically formed between the first comb tooth portion and the third comb tooth portion along the second direction is shifted by approximately Y/2.

5. The optical device according to claim 2,
wherein a particular comb tooth portion of the plurality of comb teeth portions of the first electrode is denoted as a first comb tooth portion and two comb teeth portions of the plurality of comb teeth portions of the second electrode that are adjacent to the first comb tooth portion are denoted as a second comb tooth portion and a third comb tooth portion; and
a distance X along the first direction from a center line between the first comb tooth portion and the second comb tooth portion and a center line between the first comb tooth portion and the third comb tooth portion satisfies a relationship $(0.6)\cdot(\sqrt{3}/2)\cdot a \leq X \leq (1.4)\cdot(\sqrt{3}/2)\cdot a$.

6. The optical device according to claim 2,
wherein a particular comb tooth portion of the plurality of comb teeth portions of the first electrode is denoted as a first comb tooth portion and a particular comb tooth portion of the plurality of comb teeth portions of the second electrode that is adjacent to the first comb tooth portion is denoted as a second comb tooth portion; and
an interval between the first comb tooth portion and the second comb tooth portion in the strong electric field region is smaller than an interval between the first comb tooth portion and the second comb tooth portion in the another region.

7. The optical device according to claim 6,
wherein each of the plurality of comb teeth portions of both the first electrode and the second electrode is not linear.

8. The optical device according to claim 6,
wherein each of the plurality of comb teeth portions of one electrode of either the first electrode or the second electrode is approximately linear; and
each of the plurality of comb teeth portions of another electrode of either the first electrode or the second electrode is not linear.

9. The optical device according to claim 8,
wherein each of the plurality of comb teeth portions of the another electrode is zigzag-shaped.

10. The optical device according to claim 6,
wherein each of the plurality of comb teeth portions of both the first electrode and the second electrode is approximately linear; and
each of the plurality of comb teeth portions of at least one of the first electrode and the second electrode includes a plurality of protrusions protruding in a direction intersecting with the second direction.

11. The optical device according to claim 6,
wherein each of the plurality of comb teeth portions of both the first electrode and the second electrode is approximately linear; and
each of the plurality of comb teeth portions of at least one of the first electrode and the second electrode includes a plurality of recessed portions recessed in a direction intersecting with the second direction.

12. The optical device according to claim 2,
wherein the first substrate further comprises:
a plurality of dielectric layers overlapping with outer edges of the plurality of comb teeth portions of the first electrode and outer edges of the plurality of comb teeth portions of the second electrode, and a plurality of dielectric layers including a dielectric constant different from the dielectric constant of the medium, wherein the plurality of dielectric layers are disposed in the strong electric field region or the another region.

13. The optical device according to claim 12, wherein the dielectric constant of the plurality of dielectric layers is higher than the dielectric constant of the medium; and the plurality of dielectric layers are disposed in the strong electric field region.

14. The optical device according to claim 12, wherein the dielectric constant of the plurality of dielectric layers is lower than the dielectric constant of the medium; and the plurality of dielectric layers are disposed in the another region.

15. The optical device according to claim 1, wherein each of the first electrode and the second electrode include the plurality of comb teeth portions;

the first electrode and the second electrode are arranged such that the plurality of comb teeth portions engage with each other;

the first substrate further includes a third electrode provided below the first electrode and the second electrode with an insulating layer interposed there between; and a fringe electrical field is generated in the optical layer by the first electrode, the second electrode, and the third electrode.

16. The optical device according to claim 15, wherein a period Y of the strong electric field region along the second direction and a mode diameter a of the plurality of shape-anisotropic particles satisfy a relationship $(0.6) \cdot A \le Y \le (1.4) \cdot A$.

17. The optical device according to claim 15, wherein a particular comb tooth portion of the plurality of comb teeth portions of the first electrode is denoted as a first comb tooth portion and a particular comb tooth portion of the plurality of comb teeth portions of the second electrode that is adjacent to the first comb tooth portion is denoted as a second comb tooth portion; and the position in the second direction of both the strong electric field region periodically formed along the second direction on the second comb tooth portion side of the first comb tooth portion and the strong electric field region periodically formed along the second direction on the first comb tooth portion side of the second comb tooth portion is shifted by approximately Y/2.

18. The optical device according to claim 15, wherein a particular comb tooth portion of the plurality of comb teeth portions of the first electrode is denoted as a first comb tooth portion and a particular comb tooth portion of the plurality of comb teeth portions of the second electrode that is adjacent to the first comb tooth portion is denoted as a second comb tooth portion; and a distance X along the first direction from a virtual straight line that passes through a point located closest to the second comb tooth portion among the outer edges of the first comb tooth portion and is parallel to the second direction and a virtual straight line that passes through a point located closest to the first comb tooth portion among the outer edges of the second comb tooth portion and is parallel to the second direction satisfies a relationship $(0.6) \cdot (\sqrt{3}/2) \cdot a \le X \le (1.4) \cdot (\sqrt{3}/2) \cdot a$.

19. The optical device according to claim 15, wherein each of the plurality of comb teeth portions of both the first electrode and the second electrode is approximately linear; and each of the plurality of comb teeth portions of both the first electrode and the second electrode includes a plurality of protrusions protruding in a direction intersecting with the second direction.

20. The optical device according to claim 15, wherein the first substrate further comprises:

a plurality of dielectric layers overlapping with outer edges of the plurality of comb teeth portions of the first electrode and outer edges of the plurality of comb teeth portions of the second electrode, and a plurality of dielectric layers including a dielectric constant different from the dielectric constant of the medium, wherein the plurality of dielectric layers are disposed in the strong electric field region or the another region.

* * * * *